(12) United States Patent
Retterath et al.

(10) Patent No.: US 12,313,782 B2
(45) Date of Patent: *May 27, 2025

(54) METHODS AND APPARATUS FOR ARRAY BASED LiDAR SYSTEMS WITH REDUCED INTERFERENCE

(71) Applicant: SOS LAB Co., Ltd., Gwangju (KR)

(72) Inventors: Jamie E. Retterath, Excelsior, MN (US); Robert A. Laumeyer, Oviedo, FL (US)

(73) Assignee: SOS Lab Co., Ltd., Gwangju (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/884,949

(22) Filed: Sep. 13, 2024

(65) Prior Publication Data

US 2025/0004109 A1    Jan. 2, 2025

Related U.S. Application Data

(63) Continuation of application No. 18/783,026, filed on Jul. 24, 2024, which is a continuation of application
(Continued)

(51) Int. Cl.
*G01S 7/481* (2006.01)
*G01S 7/4863* (2020.01)
(Continued)

(52) U.S. Cl.
CPC .......... *G01S 7/4815* (2013.01); *G01S 7/4863* (2013.01); *G01S 7/4865* (2013.01); *G01S 17/10* (2013.01); *G01S 17/93* (2013.01)

(58) Field of Classification Search
None
See application file for complete search history.

(56) References Cited

U.S. PATENT DOCUMENTS

| | | | |
|---|---|---|---|
| 3,971,065 A | 7/1976 | Bayer | |
| 4,185,891 A | 1/1980 | Kaestner | |

(Continued)

FOREIGN PATENT DOCUMENTS

| | | | |
|---|---|---|---|
| EP | 1764835 A1 | 3/2007 | |
| EP | 1912075 A1 | 4/2008 | |

(Continued)

OTHER PUBLICATIONS

U.S. Office Action, U.S. Appl. No. 18/783,026, dated Oct. 18, 2024.
(Continued)

*Primary Examiner* — Luke D Ratcliffe
(74) *Attorney, Agent, or Firm* — Knobbe, Martens, Olson, & Bear, LLP

(57) ABSTRACT

An array-based light detection and ranging (LiDAR) unit includes an array of emitter/detector sets configured to cover a field of view for the unit. Each emitter/detector set emits and receives light energy on a specific coincident axis unique for that emitter/detector set. A control system coupled to the array of emitter/detector sets controls initiation of light energy from each emitter and processes time of flight information for light energy received on the coincident axis by the corresponding detector for the emitter/detector set. The time of flight information provides imaging information corresponding to the field of view. Interference among light energy is reduced with respect to detectors in the LiDAR unit not corresponding to the specific coincident axis, and with respect to other LiDAR units and ambient sources of light energy. In one embodiment, multiple array-based LiDAR units are used as part of a control system for an autonomous vehicle.

17 Claims, 24 Drawing Sheets

Related U.S. Application Data

No. 17/488,018, filed on Sep. 28, 2021, now Pat. No. 12,078,756, which is a continuation of application No. 16/272,822, filed on Feb. 11, 2019, now Pat. No. 11,131,755, which is a continuation of application No. 14/078,001, filed on Nov. 12, 2013, now Pat. No. 10,203,399.

(51) Int. Cl.
  *G01S 7/4865* (2020.01)
  *G01S 17/10* (2020.01)
  *G01S 17/93* (2020.01)

(56) References Cited

U.S. PATENT DOCUMENTS

| | | |
|---|---|---|
| 4,739,398 A | 4/1988 | Thomas et al. |
| 4,935,616 A | 6/1990 | Scott |
| 5,006,721 A | 4/1991 | Cameron et al. |
| 5,026,156 A | 6/1991 | Bayston et al. |
| 5,054,911 A | 10/1991 | Ohishi et al. |
| 5,081,530 A | 1/1992 | Medina |
| 5,084,895 A | 1/1992 | Shimada et al. |
| 5,090,245 A | 2/1992 | Anderson |
| 5,094,911 A | 3/1992 | Barbezat et al. |
| 5,122,796 A | 6/1992 | Beggs et al. |
| 5,212,706 A | 5/1993 | Jain |
| 5,400,350 A | 3/1995 | Galvanauskas |
| 5,418,359 A | 5/1995 | Juds et al. |
| 5,420,722 A | 5/1995 | Bielak |
| 5,446,529 A | 8/1995 | Stettner et al. |
| 5,465,142 A | 11/1995 | Krumes et al. |
| 5,485,009 A | 1/1996 | Meyzonnetie et al. |
| 5,497,269 A | 3/1996 | Gal |
| 5,619,317 A | 4/1997 | Oishi et al. |
| 5,675,326 A | 10/1997 | Juds et al. |
| 5,682,229 A | 10/1997 | Wangler |
| 5,793,491 A | 8/1998 | Wangler et al. |
| 5,805,275 A | 9/1998 | Taylor |
| 5,831,551 A | 11/1998 | Geduld |
| 5,870,180 A | 2/1999 | Wangler |
| 5,892,575 A | 4/1999 | Marino |
| 5,940,170 A | 8/1999 | Berg et al. |
| 6,054,927 A | 4/2000 | Brickell |
| 6,057,909 A | 5/2000 | Yahav et al. |
| 6,118,518 A | 9/2000 | Hobbs |
| 6,133,989 A | 10/2000 | Stettner et al. |
| 6,150,956 A | 11/2000 | Laufer |
| 6,181,463 B1 | 1/2001 | Galvanauskas et al. |
| 6,212,480 B1 | 4/2001 | Dunne |
| 6,323,942 B1 | 11/2001 | Bamji |
| 6,327,090 B1 | 12/2001 | Rando et al. |
| 6,370,291 B1 | 4/2002 | Mitchell |
| 6,373,557 B1 | 4/2002 | Megel et al. |
| 6,377,167 B1 | 4/2002 | Juds et al. |
| 6,396,397 B1 | 5/2002 | Bos et al. |
| 6,448,572 B1 | 9/2002 | Tennant et al. |
| 6,456,368 B2 | 9/2002 | Seo |
| 6,480,265 B2 | 11/2002 | Maiman et al. |
| 6,512,892 B1 | 1/2003 | Montgomery et al. |
| 6,522,396 B1 | 2/2003 | Halmos |
| 6,535,275 B2 | 3/2003 | McCaffrey et al. |
| 6,619,406 B1 | 9/2003 | Kacyra et al. |
| 6,646,725 B1 | 11/2003 | Eichinger et al. |
| 6,654,401 B2 | 11/2003 | Cavalheiro Vieira et al. |
| 6,665,055 B2 | 12/2003 | Ohishi et al. |
| 6,674,878 B2 | 1/2004 | Retterath et al. |
| 6,683,727 B1 | 1/2004 | Göring et al. |
| 6,711,280 B2 | 3/2004 | Stafsudd et al. |
| 6,717,972 B2 | 4/2004 | Steinle et al. |
| 6,774,988 B2 | 8/2004 | Stam et al. |
| 6,828,558 B1 | 12/2004 | Arnone et al. |
| 6,843,416 B2 | 1/2005 | Swartz et al. |
| 6,873,640 B2 | 3/2005 | Bradburn et al. |
| 6,881,979 B2 | 4/2005 | Starikov et al. |
| 6,906,302 B2 | 6/2005 | Drowley |
| 6,967,569 B2 | 11/2005 | Weber et al. |
| 6,975,251 B2 | 12/2005 | Pavicic |
| 6,987,447 B2 | 1/2006 | Baerenweiler et al. |
| 7,016,519 B1 | 3/2006 | Nakamura et al. |
| 7,148,974 B1 | 12/2006 | Schmitt et al. |
| 7,149,613 B2 | 12/2006 | Stam et al. |
| 7,171,037 B2 | 1/2007 | Mahon et al. |
| 7,224,384 B1 | 5/2007 | Iddan et al. |
| 7,227,459 B2 | 6/2007 | Bos et al. |
| 7,236,235 B2 | 6/2007 | Dimsdale |
| 7,248,342 B1 | 7/2007 | Degnan |
| 7,248,344 B2 | 7/2007 | Morcom |
| 7,294,863 B2 | 11/2007 | Lee et al. |
| 7,319,777 B2 | 1/2008 | Morcom |
| 7,348,919 B2 | 3/2008 | Gounalis |
| 7,362,419 B2 | 4/2008 | Kurihara et al. |
| 7,436,494 B1 | 10/2008 | Kennedy et al. |
| 7,453,553 B2 | 11/2008 | Dimsdale |
| 7,474,821 B2 | 1/2009 | Donlagic et al. |
| 7,521,666 B2 | 4/2009 | Tsang |
| 7,534,984 B2 | 5/2009 | Gleckler |
| 7,542,499 B2 | 6/2009 | Jikutani |
| 7,544,945 B2 | 6/2009 | Tan et al. |
| 7,551,771 B2 | 6/2009 | England, III |
| 7,560,680 B2 | 7/2009 | Sato et al. |
| 7,579,593 B2 | 8/2009 | Onozawa et al. |
| 7,607,509 B2 | 10/2009 | Schmiz et al. |
| 7,623,248 B2 | 11/2009 | Laflamme |
| 7,649,654 B2 | 1/2010 | Shyu et al. |
| 7,663,095 B2 | 2/2010 | Wong et al. |
| 7,689,032 B2 | 3/2010 | Strassenburg-Kleciak |
| 7,697,119 B2 | 4/2010 | Ikeno et al. |
| 7,733,932 B2 | 6/2010 | Faybishenko |
| 7,755,743 B2 | 7/2010 | Kumahara et al. |
| 7,755,809 B2 | 7/2010 | Fujita et al. |
| 7,787,105 B2 | 8/2010 | Hipp |
| 7,787,511 B2 | 8/2010 | Jikutani et al. |
| 7,830,442 B2 | 11/2010 | Griffis et al. |
| 7,830,532 B2 | 11/2010 | DeCoi |
| 7,873,091 B2 | 1/2011 | Parent et al. |
| 7,881,355 B2 | 2/2011 | Sipes, Jr. |
| 7,888,159 B2 | 2/2011 | Venezia et al. |
| 7,894,725 B2 | 2/2011 | Holman et al. |
| 7,900,736 B2 | 3/2011 | Breed |
| 7,911,617 B2 | 3/2011 | Padmanabhan et al. |
| 7,940,825 B2 | 5/2011 | Jikutani |
| 7,944,548 B2 | 5/2011 | Eaton |
| 7,945,408 B2 | 5/2011 | Dimsdale et al. |
| 7,957,448 B2 | 6/2011 | Willemin et al. |
| 7,957,639 B2 | 6/2011 | Lee et al. |
| 7,960,195 B2 | 6/2011 | Maeda et al. |
| 7,961,328 B2 | 6/2011 | Austin et al. |
| 7,969,558 B2 | 6/2011 | Hall |
| 7,979,173 B2 | 7/2011 | Breed |
| 7,983,817 B2 | 7/2011 | Breed |
| 7,986,461 B2 | 7/2011 | Bartoschewski |
| 7,991,222 B2 | 8/2011 | Dimsdale et al. |
| 7,994,465 B1 | 8/2011 | Bamji et al. |
| 8,027,029 B2 | 9/2011 | Lu et al. |
| 8,045,595 B2 | 10/2011 | Ma |
| 8,054,203 B2 | 11/2011 | Breed et al. |
| 8,054,464 B2 | 11/2011 | Mathur et al. |
| 8,072,581 B1 | 12/2011 | Breiholz |
| 8,072,663 B2 | 12/2011 | O'Neill et al. |
| 8,077,294 B1 | 12/2011 | Grund et al. |
| 8,089,498 B2 | 1/2012 | Sato et al. |
| 8,094,060 B2 | 1/2012 | Beard et al. |
| 8,098,969 B2 | 1/2012 | Tolstikhin et al. |
| 8,102,426 B2 | 1/2012 | Yahav et al. |
| 8,111,452 B2 | 2/2012 | Butler et al. |
| 8,115,158 B2 | 2/2012 | Buettgen |
| 8,120,754 B2 | 2/2012 | Kaehler |
| 8,125,367 B2 | 2/2012 | Ludwig |
| 8,125,620 B2 | 2/2012 | Lewis |
| 8,139,141 B2 | 3/2012 | Bamji et al. |
| 8,159,598 B2 | 4/2012 | Watanabe et al. |
| 8,194,712 B2 | 6/2012 | Müller et al. |
| 8,198,576 B2 | 6/2012 | Kennedy et al. |

(56) References Cited

U.S. PATENT DOCUMENTS

| | | |
|---|---|---|
| 8,199,786 B2 | 6/2012 | Gaillard et al. |
| 8,212,998 B2 | 7/2012 | Rindle |
| 8,213,479 B2 | 7/2012 | Doerfel et al. |
| 8,229,663 B2 | 7/2012 | Zeng et al. |
| 8,235,416 B2 | 8/2012 | Breed et al. |
| 8,235,605 B2 | 8/2012 | Kim |
| 8,238,393 B2 | 8/2012 | Iwasaki |
| 8,242,428 B2 | 8/2012 | Meyers et al. |
| 8,242,476 B2 | 8/2012 | Memeault et al. |
| 8,249,798 B2 | 8/2012 | Hawes et al. |
| 8,259,003 B2 | 9/2012 | Song |
| 8,280,623 B2 | 10/2012 | Trepagnier et al. |
| 8,301,027 B2 | 10/2012 | Shaw et al. |
| 8,310,654 B2 | 11/2012 | Weilkes et al. |
| 8,319,949 B2 | 11/2012 | Cantin et al. |
| 8,325,256 B2 | 12/2012 | Egawa |
| 8,338,900 B2 | 12/2012 | Venezia et al. |
| 8,340,151 B2 | 12/2012 | Liu et al. |
| 8,354,928 B2 | 1/2013 | Morcom |
| 8,355,117 B2 | 1/2013 | Niclass |
| 8,363,156 B2 | 1/2013 | Lo |
| 8,363,511 B2 | 1/2013 | Frank et al. |
| 8,364,334 B2 | 1/2013 | Au et al. |
| 8,368,005 B2 | 2/2013 | Wang et al. |
| 8,368,876 B1 | 2/2013 | Johnson et al. |
| 8,378,287 B2 | 2/2013 | Schemmann et al. |
| 8,378,885 B2 | 2/2013 | Cornic et al. |
| 8,380,367 B2 | 2/2013 | Schultz et al. |
| 8,391,336 B2 | 3/2013 | Chiskis |
| 8,401,046 B2 | 3/2013 | Shveykin et al. |
| 8,401,049 B2 | 3/2013 | Sato et al. |
| 8,422,148 B2 | 4/2013 | Langer et al. |
| 8,426,797 B2 | 4/2013 | Aull et al. |
| 8,437,584 B2 | 5/2013 | Matsuoka et al. |
| 8,442,084 B2 | 5/2013 | Ungar |
| 8,451,432 B2 | 5/2013 | Crawford et al. |
| 8,451,871 B2 | 5/2013 | Yankov |
| 8,456,517 B2 | 6/2013 | Spektor et al. |
| 8,477,819 B2 | 7/2013 | Kitamura |
| 8,487,525 B2 | 7/2013 | Lee |
| 8,494,687 B2 | 7/2013 | Vanek et al. |
| 8,503,888 B2 | 8/2013 | Takemoto et al. |
| 8,508,567 B2 | 8/2013 | Sato et al. |
| 8,508,720 B2 | 8/2013 | Kamiyama |
| 8,508,721 B2 | 8/2013 | Cates et al. |
| 8,520,713 B2 | 8/2013 | Joseph |
| 8,531,650 B2 | 9/2013 | Feldkhun et al. |
| 8,538,636 B2 | 9/2013 | Breed |
| 8,558,993 B2 | 10/2013 | Newbury et al. |
| 8,570,372 B2 | 10/2013 | Russell |
| 8,587,637 B1 | 11/2013 | Cryder et al. |
| 8,594,455 B2 | 11/2013 | Meyers et al. |
| 8,599,363 B2 | 12/2013 | Zeng |
| 8,599,367 B2 | 12/2013 | Canham |
| 8,604,932 B2 | 12/2013 | Breed et al. |
| 8,605,262 B2 | 12/2013 | Campbell et al. |
| 8,619,241 B2 | 12/2013 | Mimeault |
| 8,633,989 B2 | 1/2014 | Okuda |
| 8,640,182 B2 | 1/2014 | Bedingfield, Sr. |
| 8,655,513 B2 | 2/2014 | Vanek |
| 8,675,184 B2 | 3/2014 | Schmitt et al. |
| 8,681,255 B2 | 3/2014 | Katz et al. |
| 8,687,172 B2 | 4/2014 | Faul et al. |
| 8,717,417 B2 | 5/2014 | Sali et al. |
| 8,717,492 B2 | 5/2014 | McMackin et al. |
| 8,723,689 B2 | 5/2014 | Mimeault |
| 8,724,671 B2 | 5/2014 | Moore |
| 8,736,670 B2 | 5/2014 | Barbour et al. |
| 8,736,818 B2 | 5/2014 | Weimer et al. |
| 8,742,325 B1 | 6/2014 | Droz et al. |
| 8,743,455 B2 | 6/2014 | Gusev et al. |
| 8,754,829 B2 | 6/2014 | Lapstun |
| 8,760,499 B2 | 6/2014 | Russell |
| 8,767,190 B2 | 7/2014 | Hall |
| 8,773,642 B2 | 7/2014 | Eisele et al. |
| 8,781,790 B2 | 7/2014 | Zhu et al. |
| 8,797,550 B2 | 8/2014 | Hays et al. |
| 8,804,101 B2 | 8/2014 | Spagnolla et al. |
| 8,809,758 B2 | 8/2014 | Molnar et al. |
| 8,810,647 B2 | 8/2014 | Niclass et al. |
| 8,810,796 B2 | 8/2014 | Hays et al. |
| 8,811,720 B2 | 8/2014 | Seida |
| 8,820,782 B2 | 9/2014 | Breed et al. |
| 8,836,921 B2 | 9/2014 | Feldkhun et al. |
| 8,836,922 B1 | 9/2014 | Pennecot et al. |
| 8,854,426 B2 | 10/2014 | Pellman et al. |
| 8,855,849 B1 | 10/2014 | Ferguson et al. |
| 8,864,655 B2 | 10/2014 | Ramamurthy et al. |
| 8,885,152 B1 | 11/2014 | Wright |
| 8,908,157 B2 | 12/2014 | Eisele et al. |
| 8,908,159 B2 | 12/2014 | Mimeault |
| 8,918,831 B2 | 12/2014 | Meuninck et al. |
| 8,928,865 B2 | 1/2015 | Rakuljic |
| 8,933,862 B2 | 1/2015 | Lapstun |
| 8,934,087 B1 | 1/2015 | Stobie et al. |
| 8,947,647 B2 | 2/2015 | Halmos et al. |
| 8,963,956 B2 | 2/2015 | Latta et al. |
| 8,988,754 B2 | 3/2015 | Sun et al. |
| 8,995,577 B2 | 3/2015 | Ullrich et al. |
| 9,032,470 B2 | 5/2015 | Meuninck et al. |
| 9,066,087 B2 | 6/2015 | Shpunt |
| 9,069,060 B1 | 6/2015 | Zbrozek et al. |
| 9,089,931 B1 | 7/2015 | Carberry et al. |
| 9,098,931 B2 | 8/2015 | Shpunt et al. |
| 9,102,220 B2 | 8/2015 | Breed |
| 9,103,715 B1 | 8/2015 | Demers et al. |
| 9,113,155 B2 | 8/2015 | Wu et al. |
| 9,119,670 B2 | 9/2015 | Yang et al. |
| 9,131,136 B2 | 9/2015 | Shpunt et al. |
| 9,137,463 B2 | 9/2015 | Gilboa et al. |
| 9,137,511 B1 | 9/2015 | LeGrand, III et al. |
| 9,142,019 B2 | 9/2015 | Lee |
| 9,158,375 B2 | 10/2015 | Maizels et al. |
| 9,185,391 B1 | 11/2015 | Prechtl |
| 9,186,046 B2 | 11/2015 | Ramamurthy et al. |
| 9,186,047 B2 | 11/2015 | Ramamurthy et al. |
| 9,191,582 B1 | 11/2015 | Wright et al. |
| 9,201,501 B2 | 12/2015 | Maizels et al. |
| 9,204,121 B1 | 12/2015 | Marason et al. |
| 9,228,697 B2 | 1/2016 | Schneider et al. |
| 9,237,333 B2 | 1/2016 | Lee et al. |
| 9,239,264 B1 | 1/2016 | Demers |
| 9,268,012 B2 * | 2/2016 | Ghosh .................. G01S 17/894 |
| 9,360,554 B2 | 6/2016 | Retterath et al. |
| 9,612,153 B2 | 4/2017 | Kawada et al. |
| 9,723,233 B2 | 8/2017 | Grauer et al. |
| 9,866,816 B2 | 1/2018 | Retterath |
| 10,036,801 B2 | 7/2018 | Retterath et al. |
| 10,203,399 B2 | 2/2019 | Retterath et al. |
| 10,585,175 B2 | 3/2020 | Retterath et al. |
| 11,131,755 B2 * | 9/2021 | Retterath ................ G01S 17/10 |
| 11,226,298 B2 | 1/2022 | Kappler et al. |
| 2002/0179708 A1 | 12/2002 | Zhu et al. |
| 2003/0043364 A1 | 3/2003 | Jamieson et al. |
| 2003/0063775 A1 | 4/2003 | Rafii et al. |
| 2003/0085867 A1 | 5/2003 | Grabert |
| 2003/0155513 A1 | 8/2003 | Remillard et al. |
| 2004/0133380 A1 | 7/2004 | Gounalis |
| 2006/0132752 A1 | 6/2006 | Kane |
| 2006/0157643 A1 | 7/2006 | Bamji et al. |
| 2006/0268265 A1 | 11/2006 | Chuang et al. |
| 2006/0279630 A1 | 12/2006 | Aggarwal et al. |
| 2007/0182949 A1 | 8/2007 | Niclass |
| 2007/0276915 A1 | 11/2007 | Setlow et al. |
| 2007/0279615 A1 | 12/2007 | Degnan et al. |
| 2007/0297615 A1 | 12/2007 | Clarke et al. |
| 2008/0147253 A1 | 6/2008 | Breed |
| 2008/0180650 A1 | 7/2008 | Lamesch |
| 2009/0045359 A1 | 2/2009 | Kumahara et al. |
| 2009/0076758 A1 | 3/2009 | Dimsdale |
| 2009/0128802 A1 | 5/2009 | Treado et al. |
| 2009/0232355 A1 | 9/2009 | Minear et al. |
| 2010/0020306 A1 | 1/2010 | Hall |
| 2010/0045966 A1 | 2/2010 | Cauquy et al. |

(56) References Cited

U.S. PATENT DOCUMENTS

| | | |
|---|---|---|
| 2010/0046953 A1 | 2/2010 | Shaw et al. |
| 2010/0128109 A1 | 5/2010 | Banks |
| 2010/0231891 A1 | 9/2010 | Mase et al. |
| 2010/0265386 A1 | 10/2010 | Raskar et al. |
| 2010/0277713 A1 | 11/2010 | Mimeault |
| 2010/0301195 A1 | 12/2010 | Thor et al. |
| 2011/0007299 A1 | 1/2011 | Moench et al. |
| 2011/0037849 A1 | 2/2011 | Niclass et al. |
| 2011/0101206 A1 | 5/2011 | Buettgen |
| 2011/0131722 A1 | 6/2011 | Scott et al. |
| 2011/0134220 A1 | 6/2011 | Barbour et al. |
| 2011/0205521 A1 | 8/2011 | Mimeault et al. |
| 2011/0216304 A1* | 9/2011 | Hall ............... G01S 17/89 356/4.01 |
| 2011/0285980 A1 | 11/2011 | Newbury et al. |
| 2011/0285981 A1 | 11/2011 | Justice et al. |
| 2011/0285982 A1 | 11/2011 | Breed |
| 2011/0295469 A1 | 12/2011 | Rafii et al. |
| 2011/0313722 A1 | 12/2011 | Zhu et al. |
| 2012/0001463 A1 | 1/2012 | Breed et al. |
| 2012/0002007 A1 | 1/2012 | Meuninck et al. |
| 2012/0002025 A1 | 1/2012 | Bedingfield, Sr. |
| 2012/0011546 A1 | 1/2012 | Meuninck et al. |
| 2012/0023518 A1 | 1/2012 | Meuninck et al. |
| 2012/0023540 A1 | 1/2012 | Meuninck et al. |
| 2012/0051383 A1* | 3/2012 | Stern ............... H01L 27/1465 372/50.21 |
| 2012/0062705 A1 | 3/2012 | Ovsiannikov et al. |
| 2012/0086781 A1 | 4/2012 | Iddan et al. |
| 2012/0098964 A1 | 4/2012 | Oggier et al. |
| 2012/0154784 A1 | 6/2012 | Kaufman et al. |
| 2012/0154785 A1 | 6/2012 | Gilliland et al. |
| 2012/0249998 A1 | 10/2012 | Elsele et al. |
| 2012/0261516 A1 | 10/2012 | Gilliland et al. |
| 2012/0262696 A1 | 10/2012 | Eisele et al. |
| 2012/0274745 A1 | 11/2012 | Russell |
| 2012/0287417 A1 | 11/2012 | Mimeault |
| 2012/0299344 A1 | 11/2012 | Breed et al. |
| 2013/0044129 A1 | 2/2013 | Latta et al. |
| 2013/0060146 A1 | 3/2013 | Yang et al. |
| 2013/0070239 A1 | 3/2013 | Crawford et al. |
| 2013/0076861 A1 | 3/2013 | Stemklar |
| 2013/0083310 A1 | 4/2013 | Ramamurthy et al. |
| 2013/0085330 A1 | 4/2013 | Ramamurthy et al. |
| 2013/0085331 A1 | 4/2013 | Ramamurthy et al. |
| 2013/0085333 A1 | 4/2013 | Ramamurthy et al. |
| 2013/0085334 A1 | 4/2013 | Ramamurthy et al. |
| 2013/0085382 A1 | 4/2013 | Ramamurthy et al. |
| 2013/0085397 A1 | 4/2013 | Ramamurthy et al. |
| 2013/0090528 A1 | 4/2013 | Ramamurthy et al. |
| 2013/0090530 A1 | 4/2013 | Ramamurthy et al. |
| 2013/0090552 A1 | 4/2013 | Ramamurthy et al. |
| 2013/0188043 A1 | 7/2013 | Decoster |
| 2013/0201288 A1 | 8/2013 | Billerbeck et al. |
| 2013/0215235 A1 | 8/2013 | Russell |
| 2013/0242283 A1 | 9/2013 | Bailey et al. |
| 2013/0242285 A1 | 9/2013 | Zeng |
| 2013/0278917 A1 | 10/2013 | Korekado et al. |
| 2013/0300740 A1 | 11/2013 | Snyder et al. |
| 2013/0300838 A1 | 11/2013 | Borowski |
| 2013/0300840 A1 | 11/2013 | Borowski |
| 2013/0321791 A1 | 12/2013 | Feldkhun et al. |
| 2013/0333840 A1 | 12/2013 | Audenaert et al. |
| 2014/0035959 A1 | 2/2014 | Lapstun |
| 2014/0152971 A1 | 6/2014 | James |
| 2014/0152975 A1 | 6/2014 | Ko |
| 2014/0160461 A1 | 6/2014 | Van Der Tempel et al. |
| 2014/0168362 A1 | 6/2014 | Hannuksela et al. |
| 2014/0211194 A1 | 7/2014 | Pacala et al. |
| 2014/0218473 A1 | 8/2014 | Hannuksela et al. |
| 2014/0240464 A1 | 8/2014 | Lee |
| 2014/0240469 A1 | 8/2014 | Lee |
| 2014/0240809 A1 | 8/2014 | Lapstun |
| 2014/0241614 A1 | 8/2014 | Lee |
| 2014/0253993 A1 | 9/2014 | Lapstun |
| 2014/0292620 A1 | 10/2014 | Lapstun |
| 2014/0313339 A1 | 10/2014 | Diessner |
| 2014/0313376 A1 | 10/2014 | Van Nieuwenhove et al. |
| 2014/0340487 A1 | 11/2014 | Gilliland et al. |
| 2014/0347676 A1 | 11/2014 | Velten et al. |
| 2014/0350836 A1 | 11/2014 | Stettner et al. |
| 2015/0002734 A1 | 1/2015 | Lee |
| 2015/0060673 A1 | 3/2015 | Zimdars |
| 2015/0077764 A1 | 3/2015 | Braker et al. |
| 2015/0082353 A1 | 3/2015 | Meuninck et al. |
| 2015/0116528 A1 | 4/2015 | Lapstun |
| 2015/0131080 A1 | 5/2015 | Retterath et al. |
| 2015/0145955 A1 | 5/2015 | Russel |
| 2015/0192677 A1 | 7/2015 | Yu et al. |
| 2015/0201176 A1 | 7/2015 | Graziosi et al. |
| 2015/0213576 A1 | 7/2015 | Meuninck et al. |
| 2015/0245017 A1 | 8/2015 | Di Censo et al. |
| 2015/0256767 A1 | 9/2015 | Schlechter |
| 2015/0269736 A1 | 9/2015 | Hannuksela et al. |
| 2015/0292874 A1 | 10/2015 | Shpunt et al. |
| 2015/0293226 A1 | 10/2015 | Eisele et al. |
| 2015/0293228 A1 | 10/2015 | Retterath et al. |
| 2015/0296201 A1 | 10/2015 | Banks |
| 2015/0304534 A1 | 10/2015 | Kadambi et al. |
| 2015/0304665 A1 | 10/2015 | Hannuksela et al. |
| 2015/0309154 A1 | 10/2015 | Lohbihler |
| 2015/0319344 A1 | 11/2015 | Lapstun |
| 2015/0319355 A1 | 11/2015 | Lapstun |
| 2015/0319419 A1 | 11/2015 | Akin et al. |
| 2015/0319429 A1 | 11/2015 | Lapstun |
| 2015/0319430 A1 | 11/2015 | Lapstur |
| 2015/0378241 A1 | 12/2015 | Eldada |
| 2015/0379362 A1 | 12/2015 | Calmes et al. |
| 2016/0003946 A1 | 1/2016 | Gilliland et al. |
| 2016/0007009 A1 | 1/2016 | Offenberg |
| 2016/0047901 A1 | 2/2016 | Pacala et al. |
| 2016/0049765 A1 | 2/2016 | Eldada |
| 2016/0161600 A1 | 6/2016 | Eldada et al. |
| 2016/0259038 A1 | 9/2016 | Retterath et al. |
| 2016/0356881 A1 | 12/2016 | Retterath et al. |
| 2017/0024602 A1 | 1/2017 | Han et al. |
| 2017/0084176 A1 | 3/2017 | Nakamura |
| 2017/0103271 A1 | 4/2017 | Kawagoe |
| 2017/0176578 A1 | 6/2017 | Rae et al. |
| 2017/0257617 A1 | 9/2017 | Retterath |
| 2017/0259753 A1 | 9/2017 | Meyhofer et al. |
| 2018/0131924 A1 | 5/2018 | Jung et al. |
| 2018/0295344 A1 | 10/2018 | Retterath |
| 2019/0058867 A1 | 2/2019 | Retterath |
| 2019/0079165 A1 | 3/2019 | Retterath et al. |
| 2019/0285732 A1 | 9/2019 | Retterath et al. |
| 2020/0319317 A1 | 10/2020 | Retterath et al. |

FOREIGN PATENT DOCUMENTS

| | | |
|---|---|---|
| EP | 1912078 A1 | 4/2008 |
| WO | WO 1998/010255 A1 | 3/1998 |
| WO | WO 2013/081984 A1 | 6/2013 |
| WO | WO 2013/127975 A1 | 9/2013 |

OTHER PUBLICATIONS

International Search Report and Written Opinion mailed Nov. 15, 2016 in International Application No. PCT/US2016/018872.

Al-Khafaji, et al., "Spectral-Spatial Scale Invariant Feature Transform for Hyperspectral Images," IEEE Transactions on Image Processing, vol. 27, No. 2, Feb. 2, 2018, 14 pages.

Itzler, "Focal-Plane Arrays: Geiger-Mode Focal Plane Arrays Enable SWIR 3D Imaging," 2011, 8 pages.

Harvey-Lynch, Inc., "Multibeam and Mobile LIDAR Solutions," 2014, 2 pages.

Hussman et al., "A Performance of 3D TOF Vision Systems in Comparison to Stereo Vision Systems," Stereo Vision, 2008, 20 pages.

Al-Khafaji et al., "Spectral-Spatial Scale Invariant Feature Transform for Hyperspectral Images," IEEE Transactions on Image Processing, vol. 27, Issue 2, Feb. 2018, 14 pages.

(56) References Cited

OTHER PUBLICATIONS

Krill et al., "Multifunction Array LIDAR Network for Intruder Detection, Tracking, and Identification," IEEE ISSNIP, 2010, pp. 43-48.
Levinson et al., "Unsupervised Calibration for Multi-Beam Lasers," Stanford Artificial Intelligence Laboratory, 2010, 8 pages.
Ling et al., "Deformation Invariant Image Matching," Center for Automation Research, Computer Science Department, University of Maryland, College Park, 2005, 8 pages.
Lindeberg et al., "Scale Invariant Feature Transform," Scholarpedia, 7(5): 10491, May 2012, 19 pages.
Webpage http://www.geforce.com/hardware/desktop-gpus/ geforce-gtxtitan/specifications, Jul. 2015, 2 pages.
Webpage, 3D LADAR & LIDAR Focal Planes and Instruments, Voxtelopto, 2007-2015, 3 pages.
ASC 3D Bringing 3D Alivel, Advanced Scientific Concepts, Inc., Feb. 9, 2010, 14 pages.
Albota et al., "Three-Dimensional Imaging Laser Radar with a Photo-Counting Avalanch Photodiode Array and Microchip Laser," Dec. 20, 2002, 8 pages.
Brazzel et al., "FLASH LIDAR Based Relative Navigation," 2015 IEEE Aerospace Conference, 2014, 11 pages.
Love et al., "Active Probing of Cloud Multiple Scattering, Optical, Depth, Vertical Thickness, and Liquid Water Content Using Wide-Angle Imaging LIDAR," 2002, 11 pages.
Superior Signal-to-Noise Ratio of a New AAI Sequence for Random-Modulation Continuous-Wave LIDAR, Optics Letters, 2004, vol. 29, No. 15.
Frequency-Modulated Continuous-Wave LIDAR Using 1/Q Modulator for Simplified Heterodyne Detection, Optics Letters, 2012, vol. 37, No. 11.
Moller et al., "Robust 3D Measurement with PMD Sensors," Proceedings of the First Range Imaging Research Day at ETH Zurich, 2005, 14 pages.
International Search Report and Written Opinion mailed Jun. 26, 2015 in International Application No. PCT/US2015/022248.
International Search Report and Written Opinion mailed Sep. 10, 2015 in International Application No. PCT/US2014/064123.

\* cited by examiner

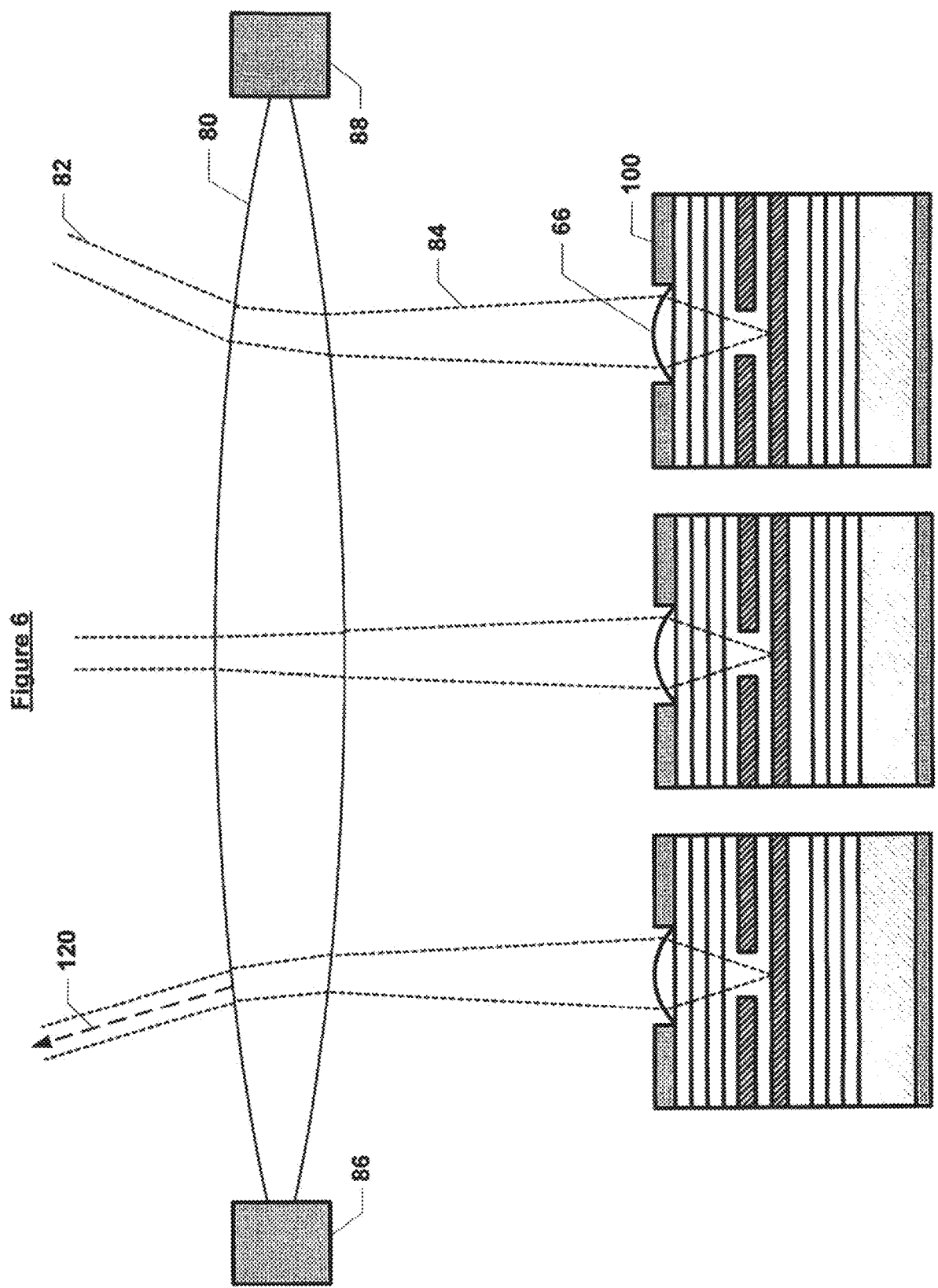

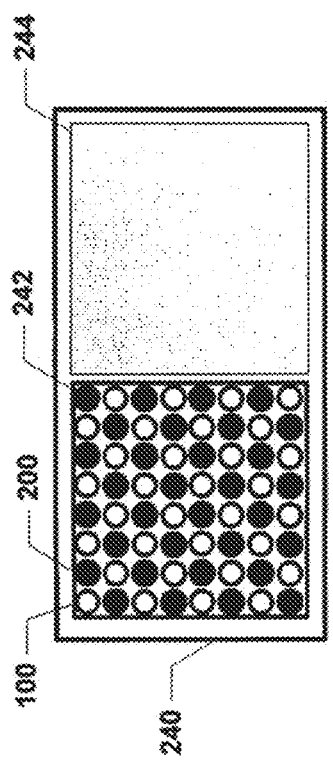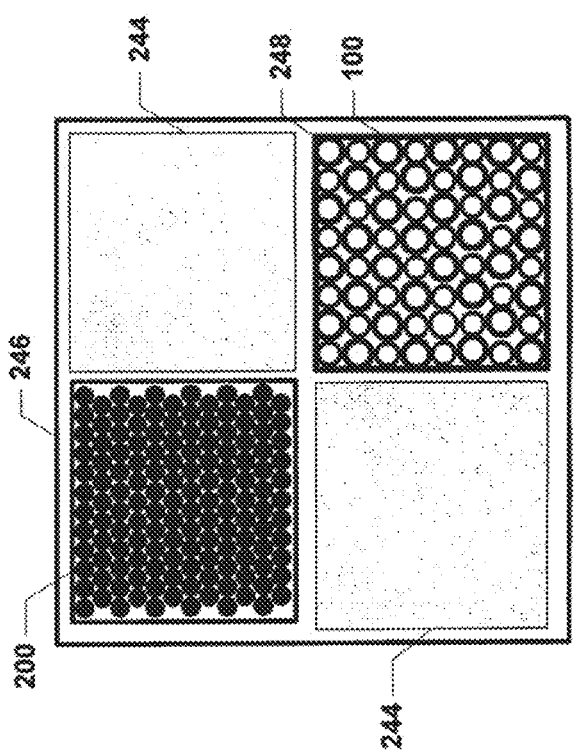

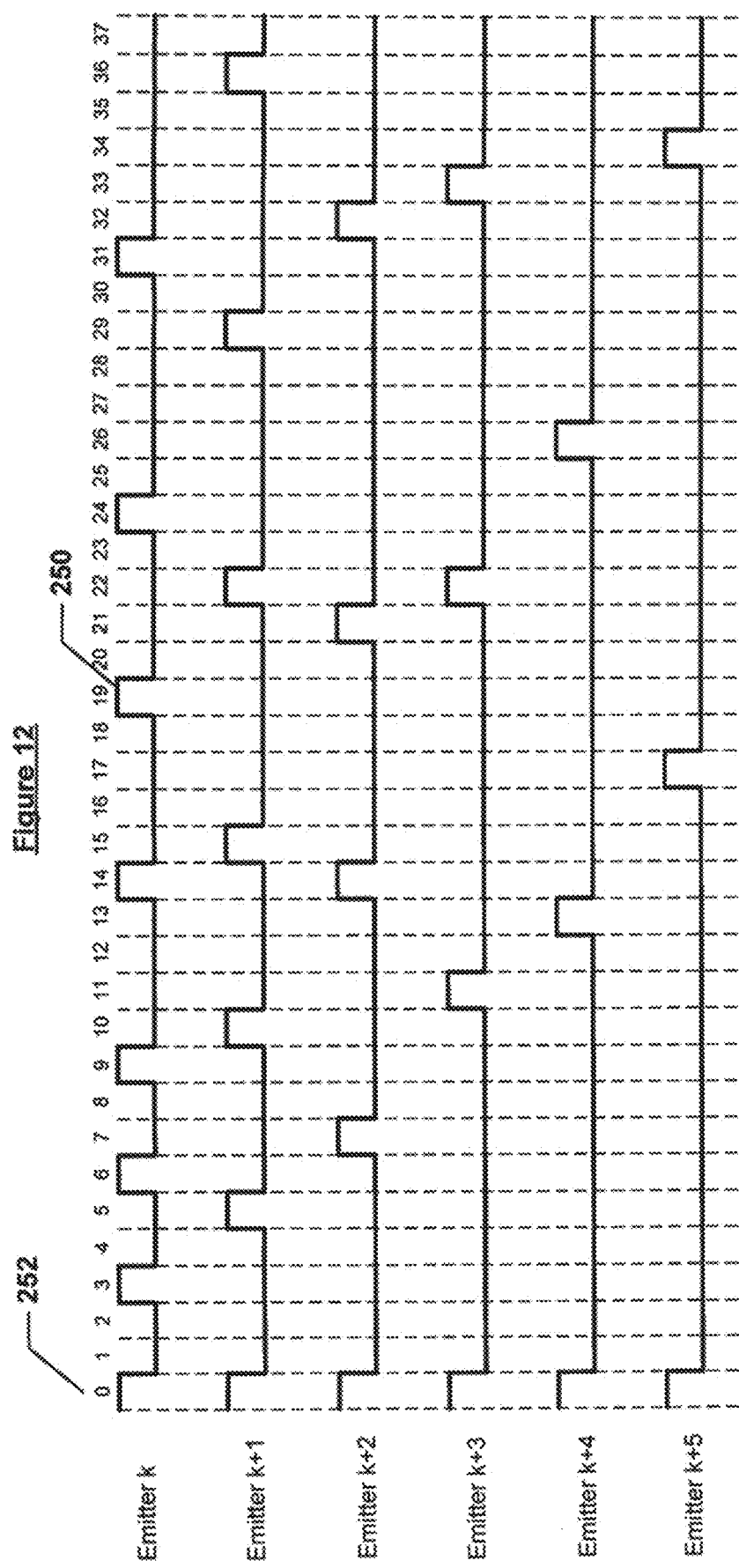

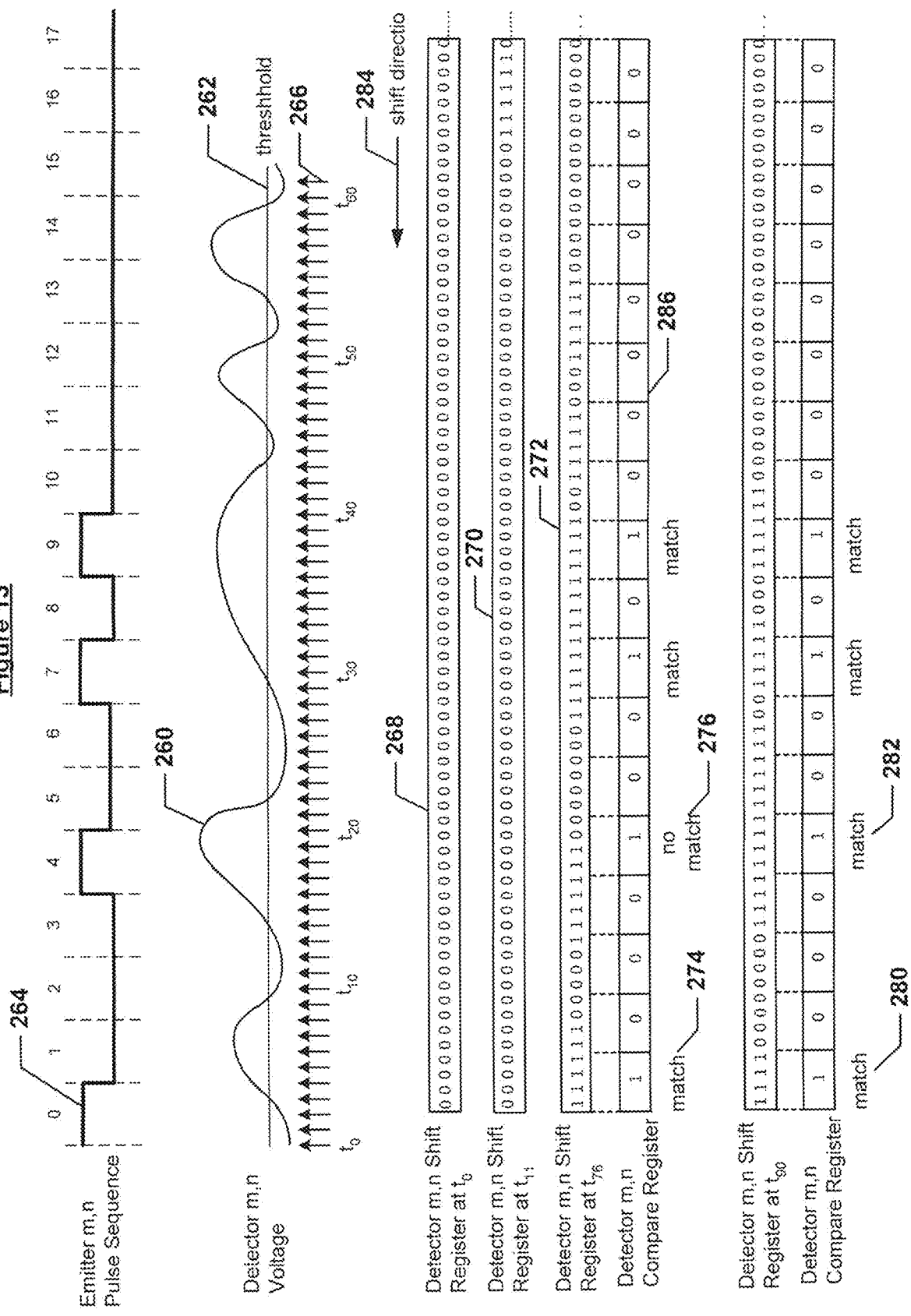

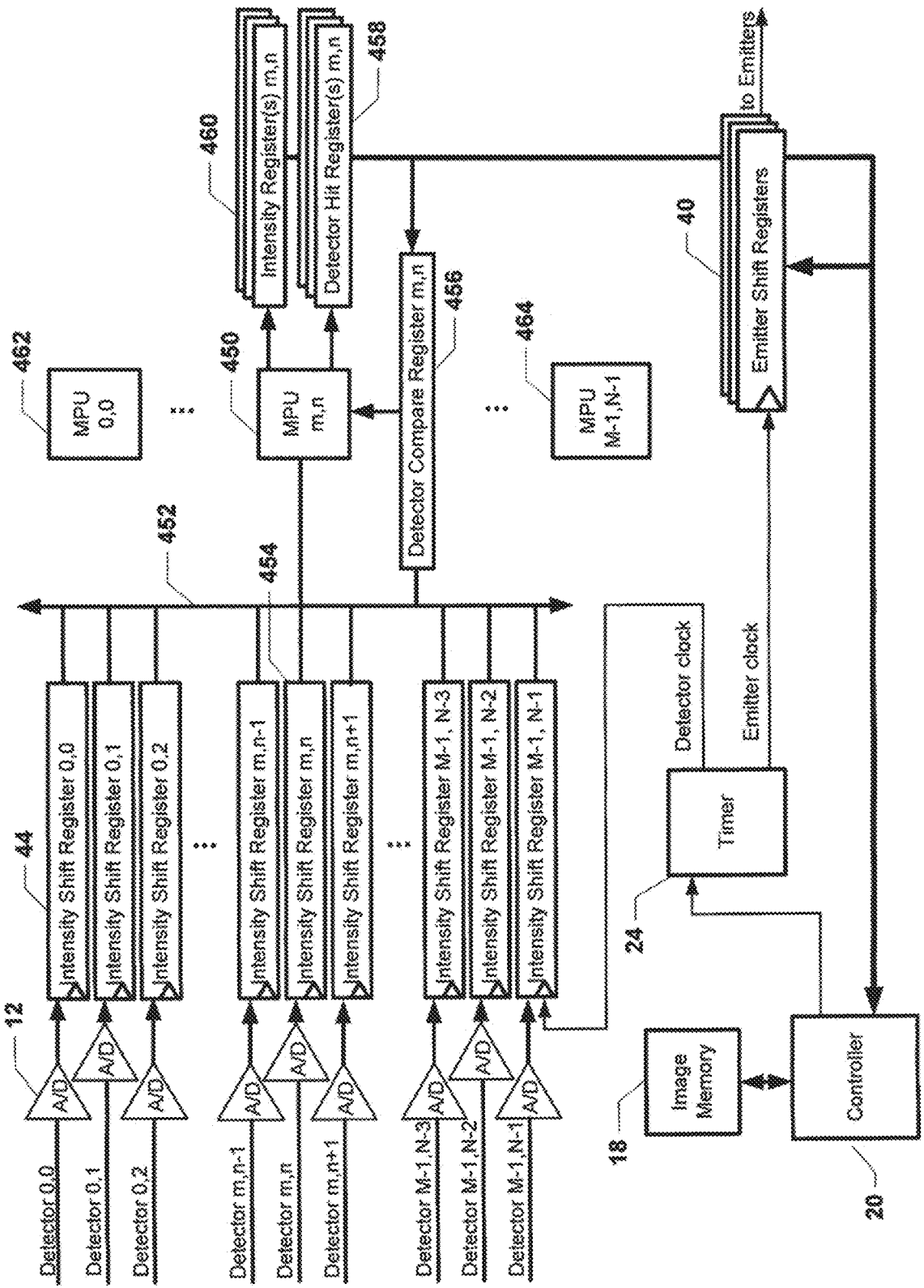

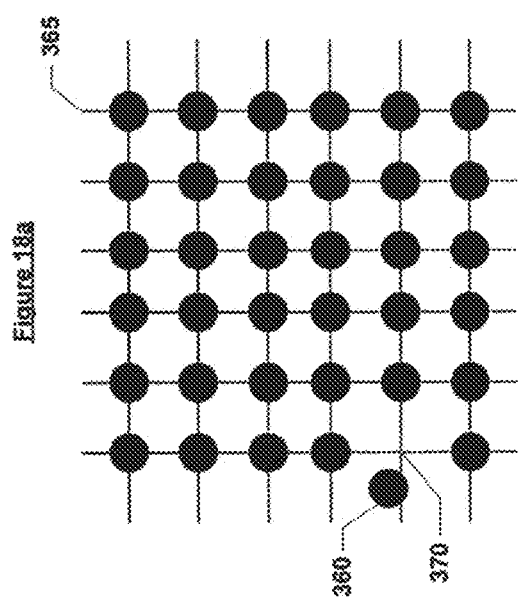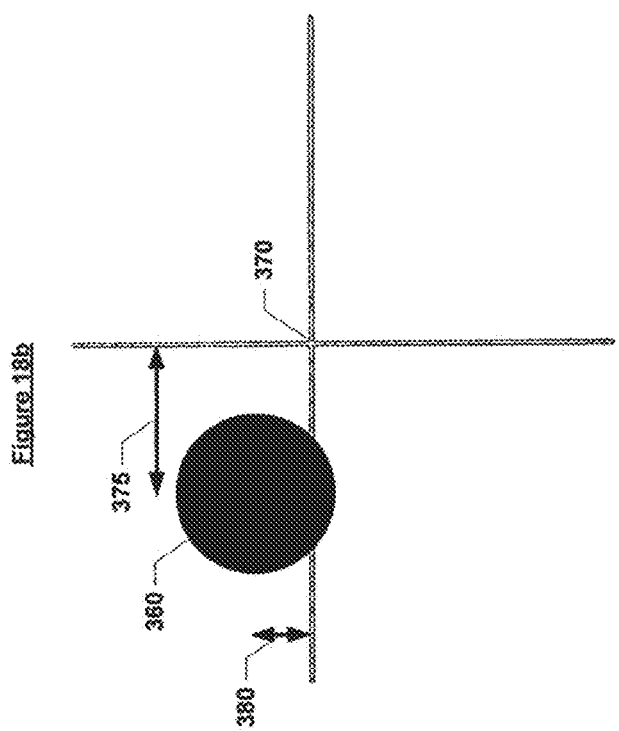

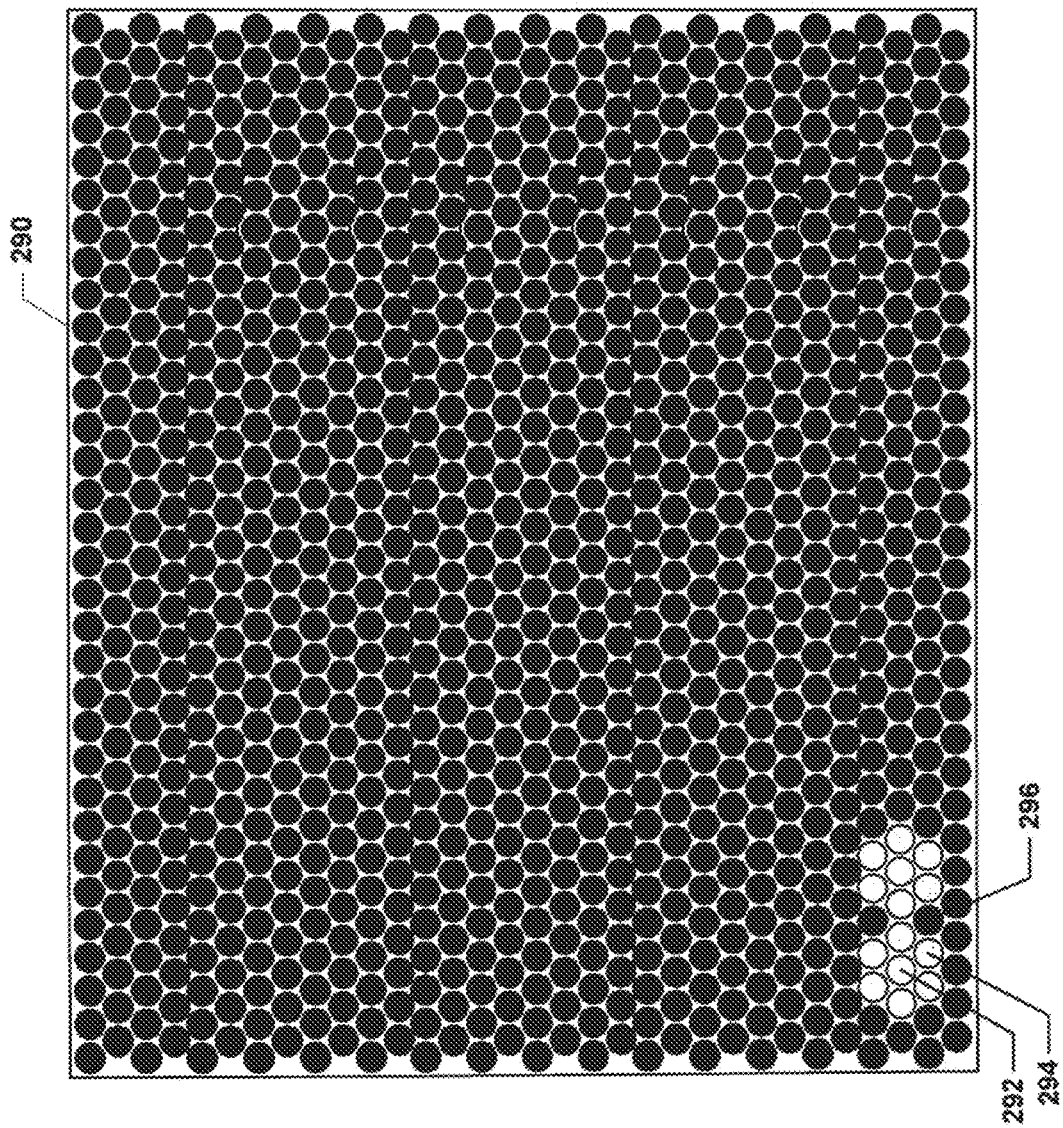

METHODS AND APPARATUS FOR ARRAY BASED LiDAR SYSTEMS WITH REDUCED INTERFERENCE

CROSS REFERENCE TO RELATED APPLICATIONS

This is a continuation of U.S. patent application Ser. No. 18/783,026 filed on Jul. 24, 2024, which is a continuation of U.S. patent application Ser. No. 17/488,018 filed on Sep. 28, 2021, now U.S. Pat. No. 12,078,756, issued on Sep. 3, 2024, which is a continuation of U.S. patent application Ser. No. 16/272,822, filed on Feb. 11, 2019, now U.S. Pat. No. 11,131,755, issued on Sep. 28, 2021, which is a continuation of U.S. patent application Ser. No. 14/078,001, filed on Nov. 12, 2013, now U.S. Pat. No. 10,203,399, issued on Feb. 12, 2019, the content of each of which is incorporated herein by reference in its entirety.

BACKGROUND

Technical Field

The present disclosure relates generally to determining presence and position in a surrounding space of objects that interact with propagating electromagnetic waves. More particularly, the present disclosure relates to non-scanning LiDAR systems using an array of emitter/detector sets to cover a given field of view that provides for reduced interference due to crosstalk among emitters within a given LiDAR unit and also among different LiDAR units.

Description of Related Technology

LiDAR (light detection and ranging) uses laser technology to make precise distance measurements over short or long distances. LiDAR units have found widespread application in both industry and the research community.

The predecessor technology to current LiDAR units were object detection systems that could sense the presence or absence of objects within the field of view of one or more light beams based on phase shift analysis of the reflect light beam. Examples of these kinds of object detection systems in the field of vehicle "blind spot" warning systems include U.S. Pat. Nos. 5,122,796, 5,418,359, 5,831,551, 6,150,956, and 6,377,167.

Current LiDAR units are typically scanning-type units that emit beams of light in rapid succession, scanning across the angular range of the unit in a fan-like pattern. Using a time of flight calculation applied to any reflections received, instead of just a phase shift analysis, the LiDAR unit can obtain range measurements and intensity values along the singular angular dimension of the scanned beam. LiDAR units typically create the scanning beam by reflecting a pulsed source of laser light from a rotating mirror. The mirror also reflects any incoming reflections to the receiving optics and detector(s).

Single-axis-scan LiDAR units will typically use a polygonal mirror and a pulsed laser source to emit a sequence of light pulses at varying angles throughout the linear field of view. Return signals are measured by a bandpass photoreceptor that detects the wavelength of light emitted by the laser. The field of view of the photoreceptor covers the entire one-dimensional scan area of the laser. Thus, each subsequent emitted pulse of laser light must occur only after the reflected signal has been received for the previous laser pulse. Dual-axis-scan LiDAR units produce distance-measured points in two dimensions by using, for instance, a pair of polygonal mirrors. The horizontal scan mirror rotates at a faster rate than the vertical scan mirror.

Flash LiDAR devices like those disclosed in U.S. Pat. No. 8,072,581 offer a way to acquire a 3D map of a scene via a solid state or mostly solid state approach. These devices illuminate an entire 2D field of view with a blanket of light and measure the return value time for each photoreceptor location in the field of view. These approaches are relegated to very close proximity applications due to the low incident laser power for each location in the field of view. For flash LiDAR at longer ranges, the usable field of view is typically too small for applications like autonomous vehicle navigation without the use of high performance cameras operating in the picosecond range for exposure times.

U.S. Pat. No. 7,969,558 describes a LIDAR device that uses multiple lasers and a 360-degree scan to create a 360-degree 3D point cloud for use in vehicle navigation. The disclosed system has two limitations. First, the rotating scan head makes the unit impractical for widespread use on autonomous vehicles and makes it unusable for inclusion in mobile devices like smart phones, wearable devices, smart glasses, etc. Second, multiple units cannot work effectively in the same relative physical space due to the potential of crosstalk.

Scanning LiDAR units typically utilize a single laser, or multiple lasers, all operating at the same wavelength. Care must be taken to ensure that signals received by the photoreceptor are reflected light from the desired emitted source. Two LiDAR units, call them A and B, operating with lasers at the same wavelength have the potential to experience crosstalk. Inbound signals at the A detector wavelength of, for example, 650 nm could be a reflected signal from an emitter for unit A, a reflected signal from unit B, or a signal directly from an emitter of unit B. In an application like autonomous vehicle navigation with multiple LIDAR sensors per vehicle on a busy roadway, the potential for crosstalk among pulsed-laser LiDAR units is quite high.

Crosstalk interference between individual LiDAR units can be reduced by utilizing time division synchronization between the units wherein the transmit times of one unit do not overlap with the transmit times of other units. This synchronization of individual units will lower the capture rate for each device and is impractical when the individual units are integrated with separate, independently-controlled systems.

The error mode for crosstalk interference among LiDAR units will typically be one or more distances being computed as lower than the actual distances or failure to find a signal, resulting in no value being reported for an individual point. For LiDAR units that utilize signal intensity from the target information, the recording intensity will typically be higher than the actual intensity of the returned signal.

U.S. Pat. No. 8,363,511 attempts to overcome the crosstalk interference problem in short range object detection systems by emitting and detecting a series of encoded pulses as part of the ultrasonic or microwave waves generated by the transducers. While this kind of encoding technique has the potential to reduce some occurrences of crosstalk interference, encoding techniques are still not sufficient for applications that may encounter an unknown and large numbers of devices that are simultaneously operating at the same or similar wavelength of emitter energy.

U.S. Pat. No. 7,830,532 also attempts to address the crosstalk interference problem in the context of short range object detection systems using infrared light for fixed location units such as garage door sensor detectors by various combinations of time division, frequency division, encoding and testing modes. While these kinds of solutions might work in the context of limited numbers of fixed object detection systems, they are not practical or effective in the context of current LiDAR technologies, especially when used in moving environments.

LiDAR units have the potential to be utilized extensively in applications like autonomous vehicle navigation, mobile computing and wearable devices. However, problems remain in developing effective LiDAR units that can address the interference challenges and operate reliably in an environment where hundreds or thousands of like devices are operating simultaneously.

SUMMARY

LIDAR (light detection and ranging) systems in accordance with various embodiments of the invention use an array of emitter/detector sets to cover a given field of view where each emitter/detector set is configured to receive reflected light energy that is on a given coincident axis unique for that emitter/detector set and process time of flight information for that received light energy. The combination of an array of emitter/detector sets coupled with the on-coincident axis approach for each of the emitter/detector sets provides for reduced interference among emitters within a given LiDAR unit and also among different LIDAR units.

LIDAR systems in accordance with various embodiments of the invention may use a multi-bit sequence of emitter pulses for each emitter/detector cycle. The multi-bit sequence is locally unique to each emitter, wherein the bit sequence differs from the bit sequences for emitters whose coincident axis/vectors are in close proximity. By selecting locally unique bit patterns for each emitter, the interference from other emitters and other similar LiDAR devices is dramatically reduced. The use of multi-bit emitter sequences also results in reduced interference from non-LiDAR devices that are transmitting or reflecting energy at the target detector wavelength.

In various embodiments, the array comprises a non-scanning, solid-state device having a multitude of emitter/detector sets arranged on a generally planer surface. In some embodiments, each emitter/detector set is a single pair of an emitter and a detector. In other embodiments, a single emitter can be optically configured to provide on-coincident axis light energy to multiple different detectors, with each unique on-coincident axis combination of the single emitter and a different detector comprising a different emitter/detector set. In some embodiments, the number of emitter/detector sets can range from a 16×16 array of emitter/detector sets up to an array of 4096×4096 emitter/detector sets. In other embodiments, the number of emitter/detector sets and the configuration arrangement can be more or less, and can be planar or non-planar depending upon the specific application for which the LiDAR system is designed.

In various embodiments, a pulse generation controller is configured to transmit a sequence of pulses from each of the emitters and a control unit is configured to compute a time of flight measurement for radiation received at each of the corresponding on-coincident axis detectors. The control unit that is coupled to the detector output can be a software processing unit or a hardware circuitry for analyzing the light energy in order to extract information about objects within the field of view of the array-based LiDAR unit. In some embodiments, the output of the detector is coupled to a microprocessor unit (MPU) that is programmed to perform the analysis on the received light energy. In other embodiments, a pulse detection circuit is configured to analyze an output signal of the detector, such as an associated output signal of a detector shift register. While the timing of the sequence pulses is known within the LiDAR unit, coordination and advance knowledge of the timing and/or wavelength of emitted light energy from other LiDAR units is not required as in prior art LiDAR systems in order to reduce crosstalk and interference among different LiDAR units.

In various embodiments, the field of view of the LiDAR unit is predetermined based on the optic configuration associated with each of the sets of emitter/detectors for a unique on-coincident axis. In one embodiment, each emitter/detector set includes an optical waveguide through which the received light energy is directed for the on-coincident axis for that emitter/detector set. In another embodiment, each emitter/detector set in an array of emitter/detector sets includes a micro-lens through which the emitted light energy is directed for the on-coincident axis for that emitter/detector set. In some embodiments, an array of micro-lens optics includes a micro-lens unique for each emitter/detector set. In other embodiments, an array of micro-lens optics includes more than one micro-lens for each emitter. In other embodiments, a macro lens arrangement can be used to establish the unique on-coincident axis associated with each emitter/detector set. In some embodiments, such as the micro-lens array embodiment, the macro field of view of the LiDAR unit is effectively established upon fabrication of the micro-lens array together with the array of emitter/detector sets. In other embodiments, the macro field of view may be changed by a global lensing arrangement that is adjustable.

In various embodiments, each detector in the array-based LiDAR unit has a unique angle of coincidence relative to the optic configuration through which the reflected light energy is received. For purposes of the present disclosure, the angle of coincidence of a given detector is defined as the center of the area of the light beam received by the detector not including any modifications to the light beam due to optic elements internal to the LiDAR unit. In some embodiments, the light energy is emitted and received as collimated or coherent electromagnetic energy, such as common laser wavelengths of 650 nm, 905 nm or 1550 nm. In some embodiments, the light energy can be in the wavelength ranges of ultraviolet (UV)—100-400 nm, visible—400-700 nm, near infrared (NIR)—700-1400 nm, infrared (IR)—1400-8000 nm, long-wavelength IR (LWIR)—8 um-15 um, or far IR (FIR)—15 um-1000 um. The various embodiments of the present disclosure can provide reduction of interference at these various wavelengths not only among emitted and reflected light energy of LiDAR devices, but also emitted and reflected light energy from other ambient sources such as vehicle headlights and the sun that will also be sources of interference for typical LiDAR units.

BRIEF DESCRIPTION OF THE DRAWINGS

FIG. 6 illustrates the functional layers of vertical emitters with a device emitter lens according to an embodiment.

FIGS. 11a and 11b illustrates two device layout options according to an embodiment.

FIG. 12 illustrates a pulse timing sequence for multiple emitters according to an embodiment.

FIG. 13 illustrates the timing of a detector signal and how it is compared to the emitted pulse sequence according to an embodiment.

FIG. 17 illustrates the functional block diagram for the detector circuitry for MPU detector processing.

FIGS. 18a and 18b illustrate a pattern utilized for emitted ray angle adjustments according to an embodiment.

FIG. 19 illustrates a dense detector array according to an embodiment.

DETAILED DESCRIPTION

Figure 1:
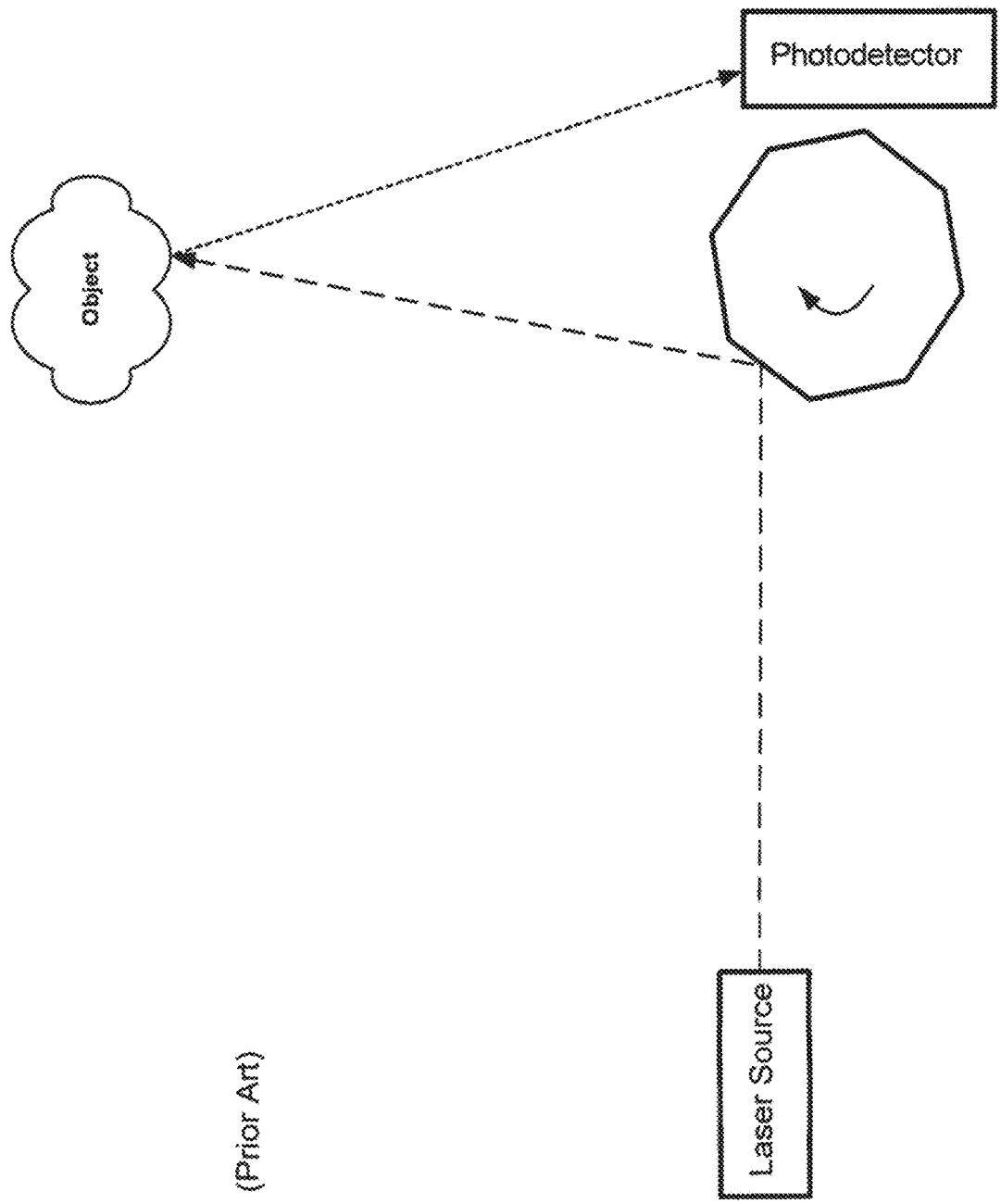
FIG. 1 illustrates a single-axis-scan device.

Single-axis-scan LiDAR (light detection and ranging) units will typically use a polygonal mirror and a pulsed laser source to emit a sequence of light pulses at varying angles throughout the linear field of view. Return signals are measured by a bandpass photoreceptor that detects the wavelength of light emitted by the laser. The field of view of the photoreceptor covers the entire scan area of the laser. Thus, each subsequent emitted pulse of laser light must occur only after the reflected signal has been received for the previous laser pulse. FIG. 1 shows some essential elements of a typical single-axis-scan LiDAR unit. The laser source is pulsed multiple times as each face of the polygonal mirror rotates past the laser axis. Each rotation of a mirror face corresponds to a single linear scan of locations. For each point of a scan, the distance and angle are recorded. Many LiDAR applications also include return signal intensity, thus encoding more information about the object that produced the reflected the return signal. Two dimensional scans of objects and/or scenes are created by affixing a single-axis-scan LiDAR to an object in motion, with the scan axis of the LiDAR roughly perpendicular to the travel direction of the vehicle.

Figure 2:
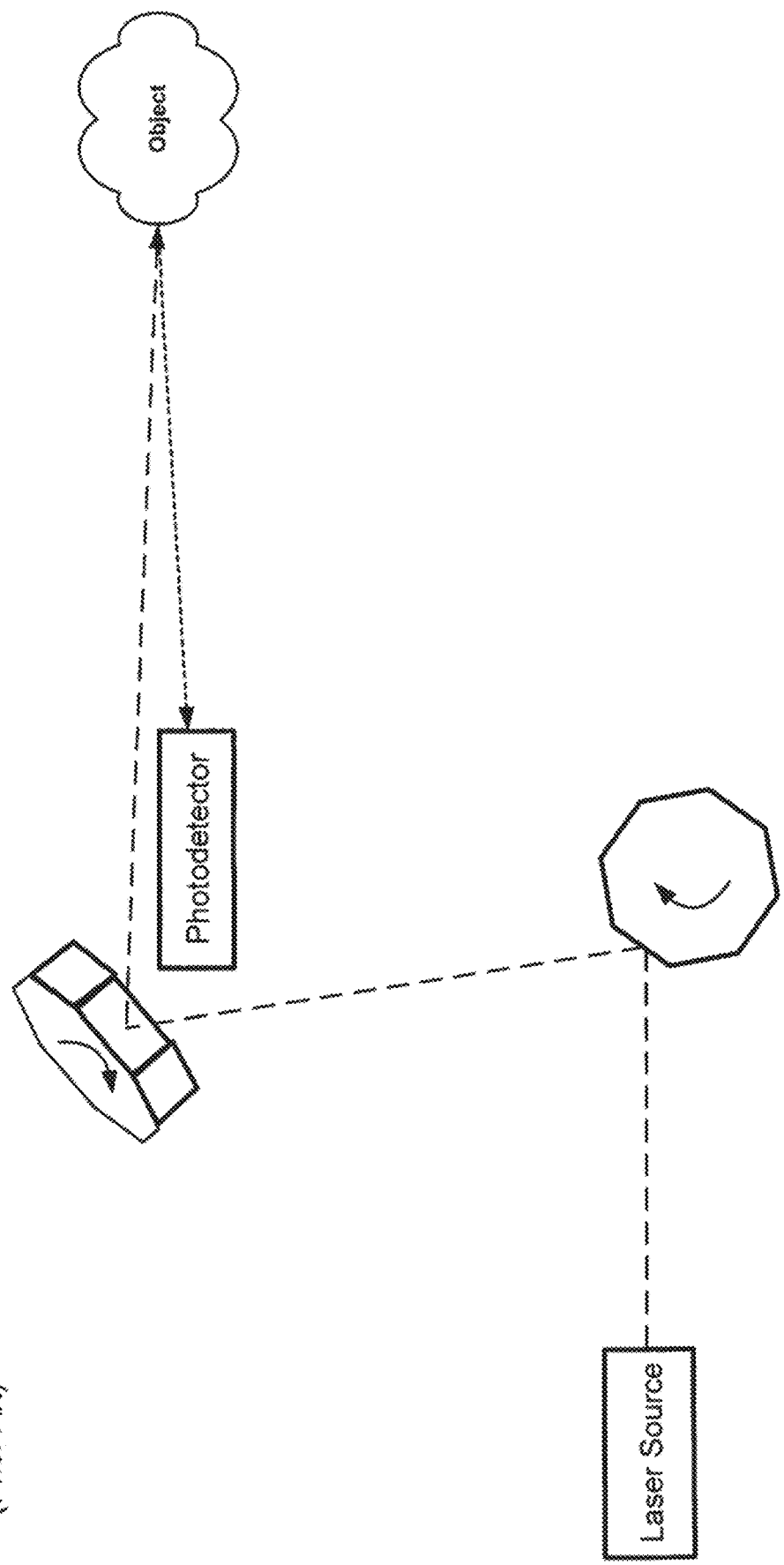
FIG. 2 illustrates a dual-axis-scan device.

Dual-axis-scan LiDAR units produce distance-measured points in two dimensions by using, for instance, a pair of polygonal mirrors. The horizontal scan mirror rotates at a faster rate than the vertical scan mirror. FIG. 2 shows some of the essential elements of a typical dual-axis scan LiDAR unit. Other methods can be used to achieve laser scans in two dimensions. These methods, for the most part, rely on mechanical or electromagnetic movement of one or more objects to achieve the laser scan in two dimensions.

LiDAR units will utilize a single laser, or will utilize multiple lasers all operating at the same wavelength. Care must be taken to ensure that signals received by the photoreceptor are reflected light from the desired emitted source. Two LiDAR units, call them A and B, operating with lasers at the same wavelength have the potential to experience crosstalk. Inbound signals at the A detector wavelength of, for example, 650 nm could be a reflected signal from an emitter for unit A, a reflected signal from unit B, or a signal directly from an emitter of unit B. In an application like autonomous vehicle navigation with multiple LiDAR sensors per vehicle on a busy roadway, the potential for crosstalk interference among pulsed-laser LiDAR units is quite high. Crosstalk interference between individual units can be reduced by utilizing synchronization between the devices wherein the transmit times of one device do not overlap with the transmit times of other devices. This synchronization of individual units will lower the capture rate for each device and is impractical when the individual devices are integrated with separate, independently-controlled systems.

Figure 3:
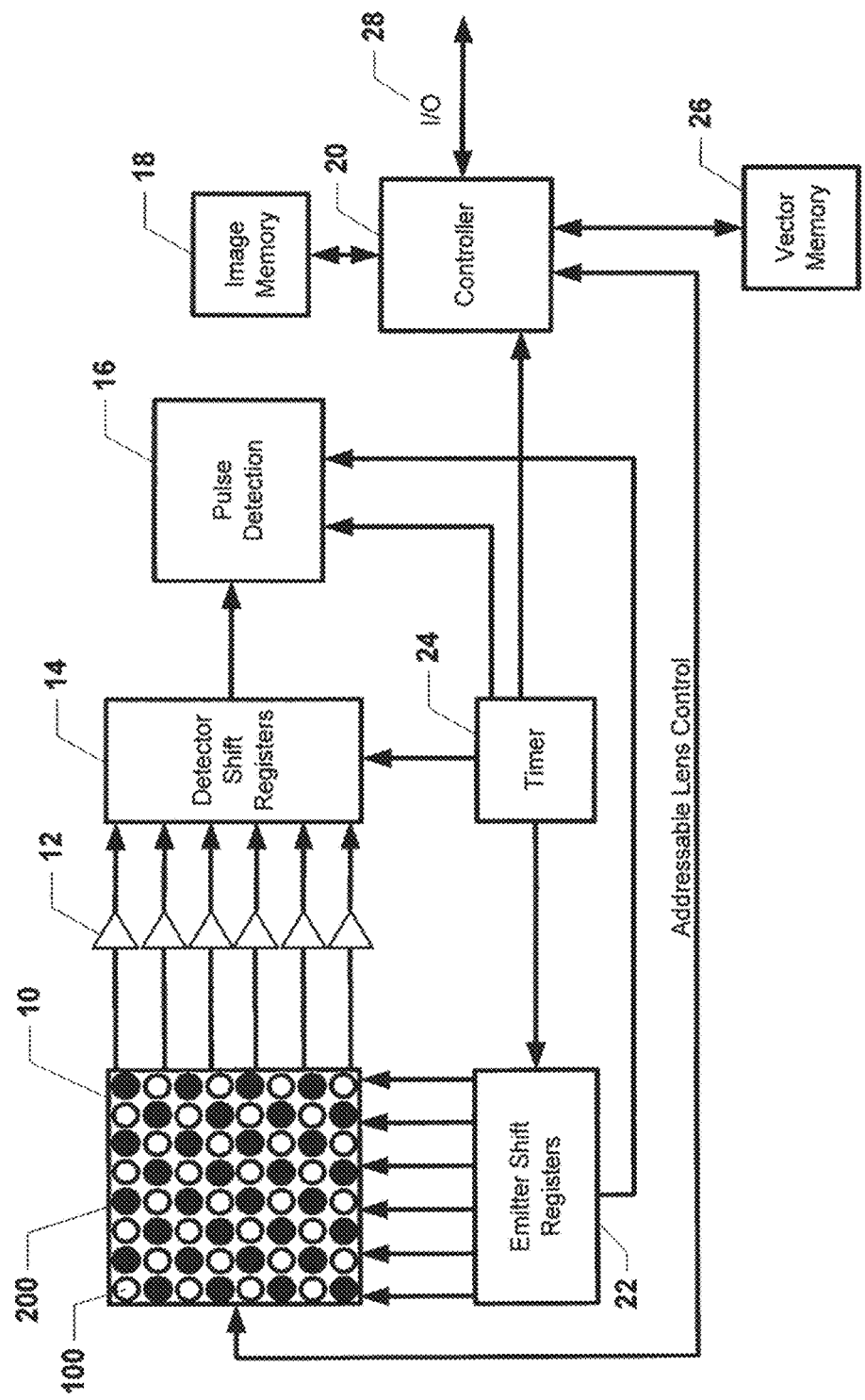
FIG. 3 illustrates a functional block diagram of a measurement system according to an embodiment.

Referring to FIG. 3, a block diagram of an optoelectronic LiDAR device in accordance with an embodiment is depicted. According to an embodiment, optoelectronic LIDAR device 300 can comprise an emitter/detector array 10, a pulse generation circuit 22, a sampling circuit 12 and a control unit 20. Emitter/detector array 10 can comprise a plurality of emitter elements 100 and detector elements 200 symmetrically arranged in rows and columns. Each emitter of emitter elements 100 of emitter/detector array 10 can comprise vertically-constructed laser diodes that can be configured to project beams of light at known angles relative to a vector of the device normal to a plane of the array 10. Detector elements 200 of emitter/detector array 10 can comprise a bandpass photodetector that can be configured to generate waveguides at known angles relative to a vector of the device normal to a plane of the array 10. For each emitter/detector set of elements 100/200, the emitter and detector vectors are coincident and form a common on-coincident axis that is at an angle relative to a vector normal to the plane of the array that is unique for that emitter/detector set.

For purposes of the present disclosure, the terminology "on-coincident axis" will be used to refer to the common known angle of both the emitted and reflected electromagnetic energy for a given set of emitter/detector elements. It will be understood that "on-coincident axis" includes energy emitted or reflected on the specific vectors that define the coincident axis, as well as energy emitted or reflected at angles that are relatively close to the same angle, such as angles within the surface area of the received light beam as defined by the edges of the light beam entering the LiDAR unit that will be received at the detector.

In embodiments, pulse generation circuit 22 can comprise a series of logic devices such as a sequence of shift registers configured to generate an output signal, such as pulse, to activate an emitter of emitter elements 100. Pulse generation circuit 22 utilizes at least one first clock signal generated by a timer 24 to initiate the propagation of data through each of the sequence of shift registers. In some embodiments, each individual emitter of emitter elements 100 has a dedicated shift register in the pulse generation circuit 22. In other embodiments, unique control signals, multiplexed control signals or control signals received over a parallel or serial bus connection may be used to initiate the propagation of the emitter elements.

In an embodiment, sampling circuit 12 can comprise an analog-to-digital converter and/or other electronic components such as transistors or capacitors to process an output signal from each of the plurality of detector elements 200. Each detector of detector elements 200 can be configured as a photoreceptor such as a photodiode or phototransistor which converts light into an electrical signal. The electrical signal is then converted to a discrete-time digital signal (i.e., sampled) by sampling circuit 12, whereby the sampled digital signals are accumulated (i.e., summed or averaged) and stored by detector shift register 14 or other type of digital memory element. Detector shift register 14 can utilize a second clock signal generated by timer 24 to trigger accumulation of the digital signals based on an oscillation event of the second clock signal. In embodiments, the frequency of the second clock signal generated by timer 24 for detector shift register 14 should be greater than twice the frequency of the first clock signal generated by timer 24 for the pulse generation circuit 22:

$$f_{detector} > 2 * f_{emitter} \quad (\text{eq. 1})$$

where $f_{detector}$=the frequency of the detector shift register clock; and
$f_{emitter}$=the frequency of the pulse generation circuit clock.

In operation, for example, the detector frequency will be eight to 32 times the emitter frequency when hardware detection is used, and will be eight to 128 times the emitter frequency when software detection is used.

In other embodiments, optoelectronic device 300 can further comprise a pulse detection unit 16 that can be configured to analyze the output signal of pulse generation circuit 22 in comparison to the output signal of detector shift register 14 to identify a match between the output signals. Pulse detection unit 16 utilizes a third clock signal generated by timer 24 to determine a time at which a match in the output signals is detected. In embodiments, pulse detection unit 16 can comprise computer readable media (not shown) such as RAM, ROM, or other storage devices to store the time at which a match was detected for each detector of detector elements 200. At the end of a sampling sequence the control unit 20 will read the match time for each detector of detector elements 200 and compute the distance to the reflected object based on a time of flight calculation. The distance for each emitter of emitter elements 100 and detector of detector elements 200 is stored in an image memory 18. Each emitter of emitter elements 100 has a vector associated with it that corresponds to the axis of the beam from the emitter of emitter elements 100 relative to the normal vector of the device. All emitter element 100 vectors are stored in a vector memory 26. All information is transferred to/from the device via the input/output (I/O) 28 connection.

Figure 4:
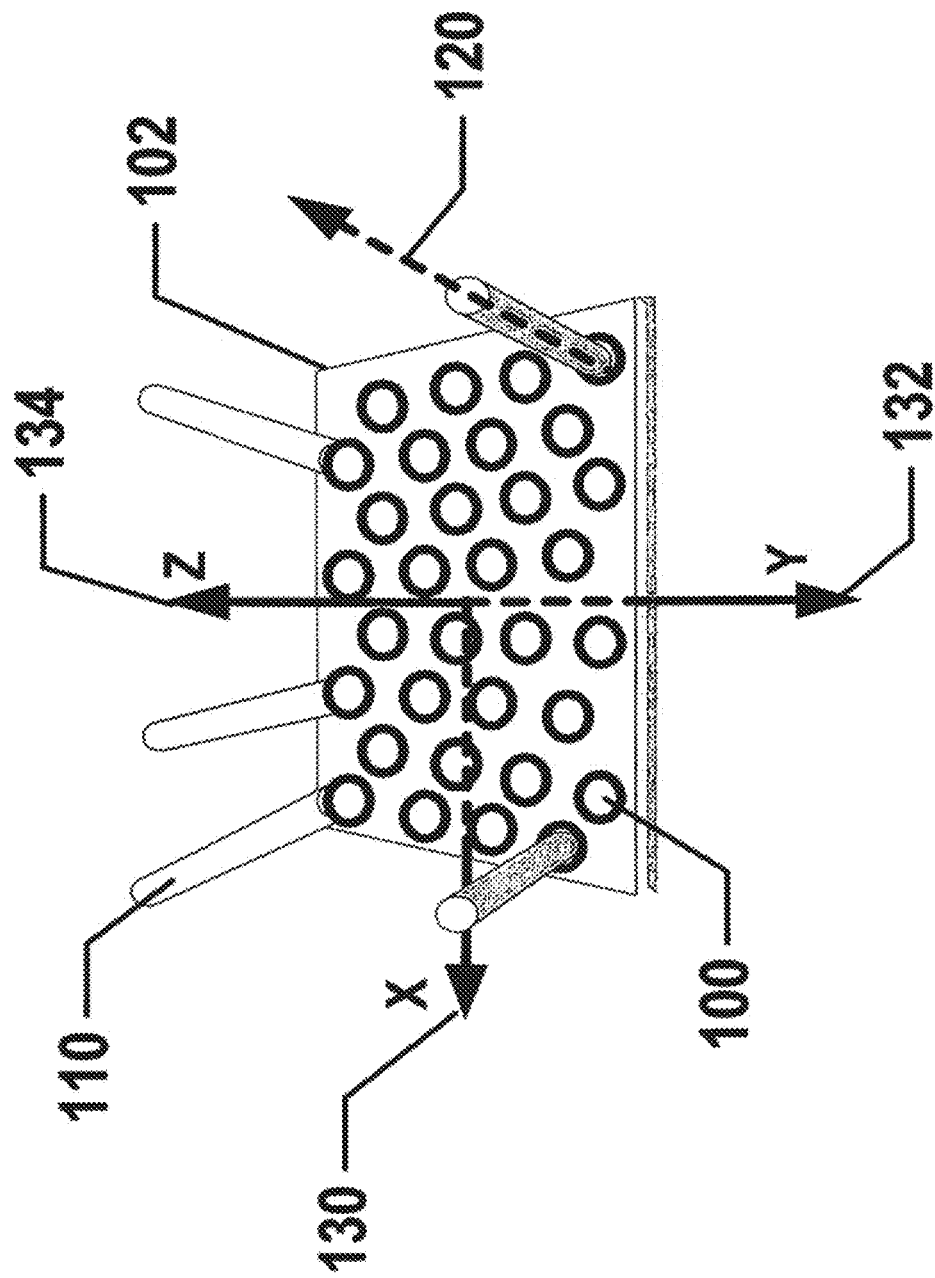
FIG. 4 illustrates the geometry of multiple emitters according to an embodiment.

Referring to FIG. 4, an illustration of a perspective view of emitter unit 102 according to an embodiment is shown. In embodiments, emitter unit 102 can comprise emitter elements 100 arranged symmetrically about a top surface of emitter unit 102. Each emitter of emitter elements 100 is configured to emit a beam of light 110. The normal vector is shown as the z-axis 134 in the right-hand-rule coordinate system. The field of view may vary with each optoelectronic device depending upon the application. A long range device, for example, will have a narrow field of view for both the horizontal and vertical dimensions. The maximum horizontal field of view for a flat device, measured in alignment with an x-axis 130, is 180 degrees, and the maximum vertical field of view for a flat device, measured in alignment with a y-axis 132, is 180 degrees. Fields of view greater than 180 degrees along both the x-axis and y-axis are achievable by utilizing 3D semiconductor fabrication techniques or by including additional optics that allow a flat semiconductor device to project incident radiation into the negative z-axis space.

For a device where the angular spacing of successive emitter elements 100 is equivalent across the horizontal and vertical fields of view, each emitter of emitter elements 100 projection angle beam of light 110 is expressed as an emitter vector 120 utilizing uvw nomenclature, where u corresponds to the x-axis 130, v corresponds to the y-axis 132, and w corresponds to a z-axis 134:

$$uvwij = [\tan(FOVhoriz*(1/2 - m/(M-1))), \quad (\text{eq. 2})$$
$$\tan(FOVvert*(1/2 - n/(N-1))), 1]$$

where FOVhoriz is the horizontal field of view expressed in degrees
fOVvert is the vertical field of view expressed in degrees
M is the number of horizontal elements in the emitter array
m signifies the horizontal element number, ranging from 0 to M-1
N is the number of vertical elements in the emitter array
n signifies the vertical element number, ranging from 0 to N-1

Various other methods are available for the selection of emitter vector 120 for emitter elements 100. Some device applications may require a higher point density at or near the center of the field of view and a sparser distribution of points toward the edges of the field of view.

Figure 5A:
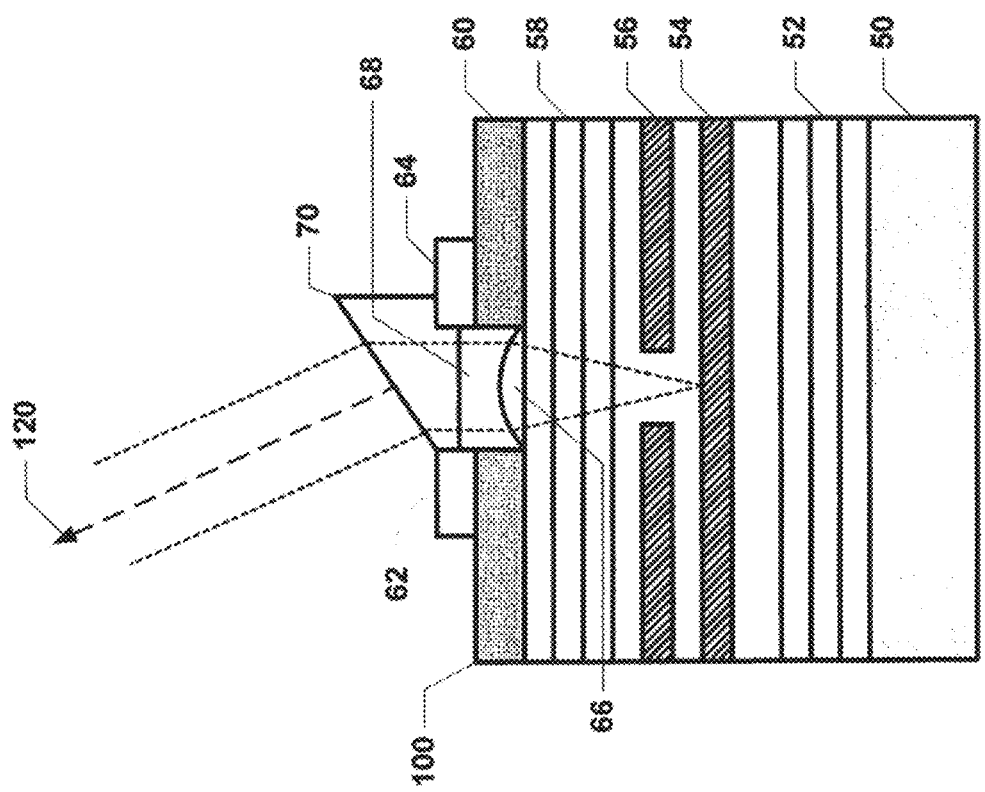
FIGS. 5a and 5b illustrate the functional layers of a vertical emitter with a micro lens according to an embodiment.

Referring to FIG. 5a, a cross section of a side view of an emitter of emitter elements 100 fabricated with a semiconductor laser is shown according to an embodiment. In embodiments, emitter elements 100 can be fabricated to emit a light beam in the direction of the semiconductor layer stack. Utilizing a vertical transmission layer stack allows for small spacing between individual emitters on a device and allows for simpler optics.

The semiconductor laser comprises a substrate 50, a lower reflector 52, an active layer 54, a high-resistance region 56, an upper reflector 58 and an electrode 60 which are sequentially stacked on the substrate 50. In an embodiment, each of the lower reflector 52 and the upper reflector 58 is a distributed Bragg reflector which is formed by alternately stacking material layers having different refractive indexes and having opposite doping type.

The light emitted from a vertical semiconductor laser will be a diverging beam. An emitter lens 66 is fabricated on the top of the laser stack to create a collimated beam of light 68. A directional lens 70 directs the collimated beam of light 68 along a desired emitter vector 120.

For high-precision applications emitter vector 120 of each emitter of emitter elements 100 may require minute adjustments. In embodiments, emitter elements 100 can comprise directional lens electrodes 62, 64 to provide a voltage differential laterally across the directional lens 70. In a preferred embodiment each directional lens 70 will have an electrode pair in both the x-axis and y-axis, with each electrode pair controlling emitter vector 120 along the x-axis and y-axis. The directional lens electrodes 62, 64 values are addressable and are modified by the control unit 20.

Figure 5B:
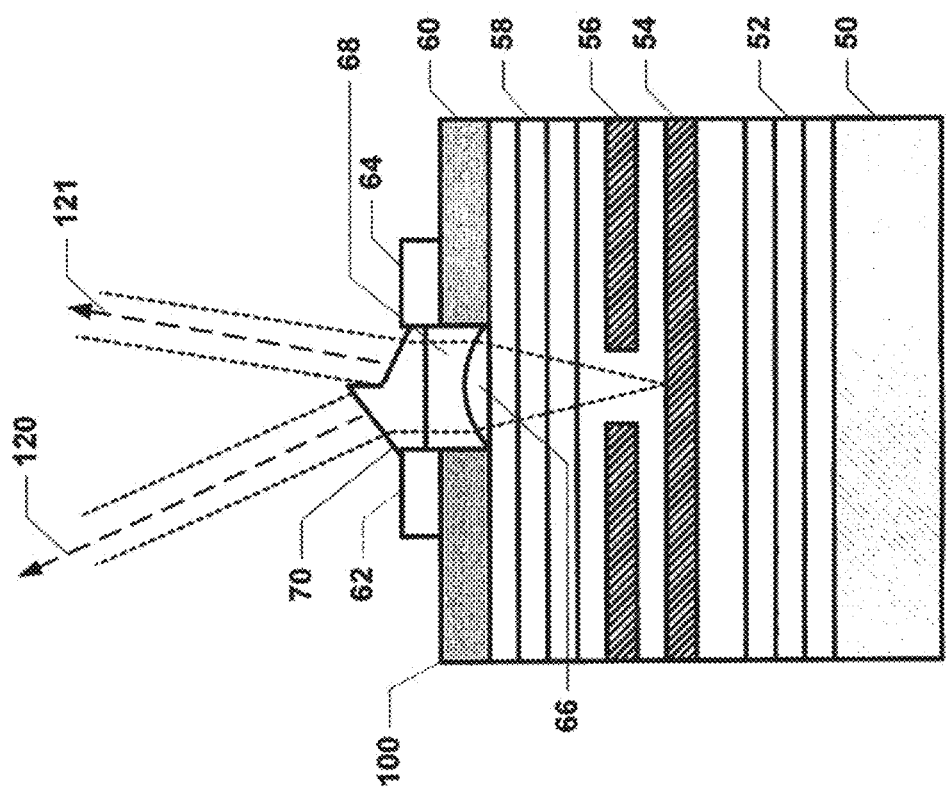

One skilled in the art will understand that alternate constructions of micro-lenses are possible. In accordance with various embodiments of the invention, such alternate constructions should result in independently-controlled emitters that produce beams at known or characterizable vectors 120 relative to the device's normal vector 134. Constructions for adjustable emitter micro lenses can include, but are not limited to, electro-optic materials that change refractive index in response to an electric field, piezoelectric materials that experience a modification of their shape in response to an electric field, or transparent encapsulated liquid lenses. FIG. 5b shows the same vertical semiconductor laser as FIG. 5a, with the exception of the emitter lens 66. The dual directional lens 70 in FIG. 5b has two distinct transmission surfaces. Roughly 50% of the collimated beam of light 68 is directed along emitter vector 120, while most of the remaining light from beam of light 68 is directed along vector 121. Since both beams are created from the same emitter of emitter elements 100, they will have the same transmitted pulse waveform. Each reflected beam, however, will have a different coincident axis and will be detected by a separate waveguide detector or by a separate detector or group of detectors in the dense detector array. In an embodiment, the number of distinct transmission surfaces on a multi-directional lens can vary from two to 64 provided the coincident axis of each unique surface is sufficiently different from the coincident axis of the other lens surfaces.

Referring to FIG. 6, a cross section side view of emitter elements 100 with a macro lens 80 according to an embodiment is shown. In embodiments, each emitter of emitter elements 100 and emitter lens 66 produces a converging beam 84. The macro lens 80 is configured to diverge to produce a plurality of beams 82 along a multitude of emitter vectors (coincident axes) 120 throughout the device's field of view.

Emitter directional lens electrodes 86, 88 may be added to provide a voltage differential laterally across the macro lens 80. In an embodiment, the macro lens 80 will have an electrode pair in both the x-axis and y-axis, with each electrode pair controlling emitter vector (coincident axis) 120 along the x-axis and y-axis. The emitter directional lens electrodes 86, 88 values are addressable and are modified by the control unit 20.

Figure 7:
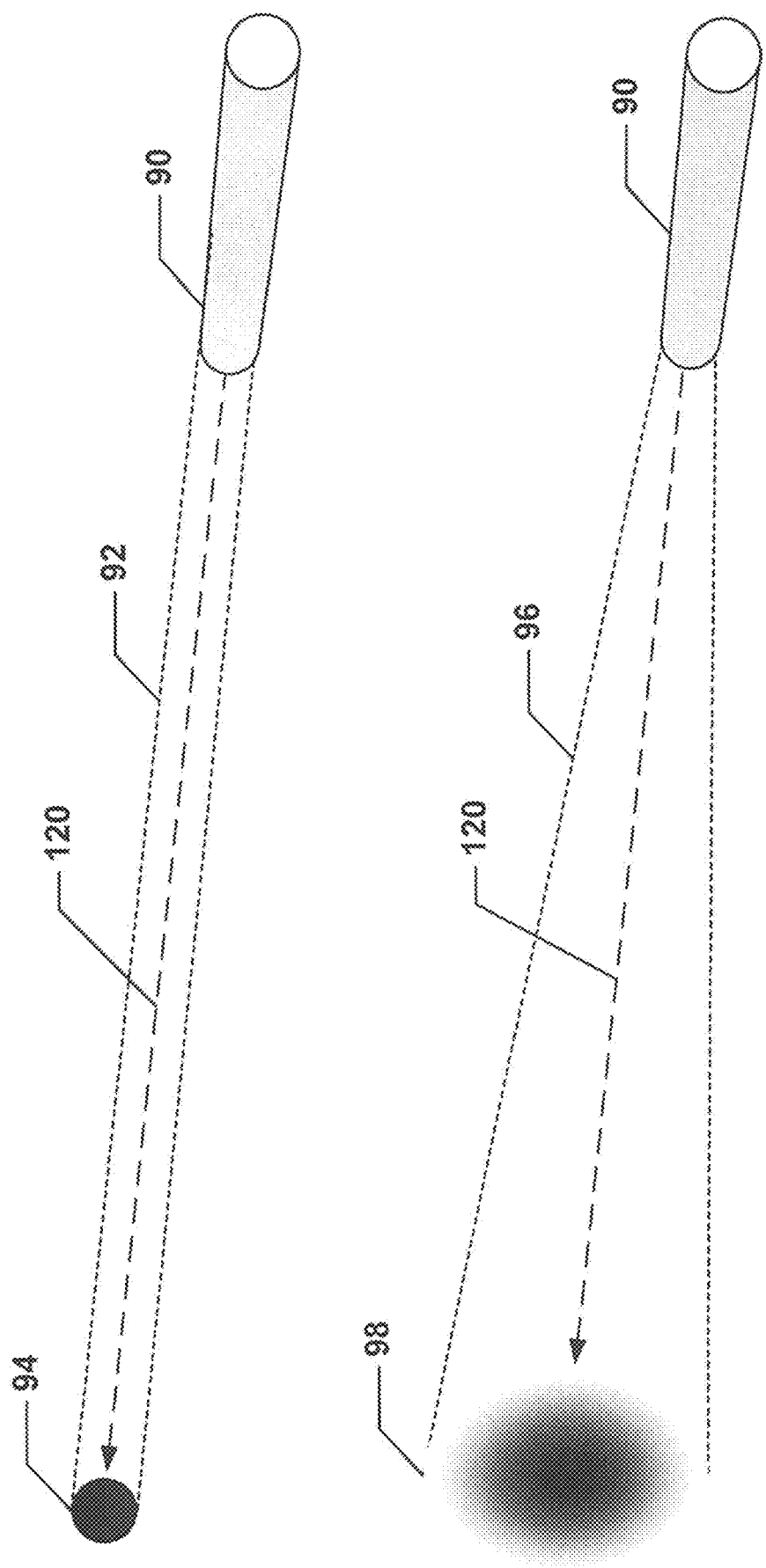
FIG. 7 illustrates the beam profiles for emitted light according to an embodiment.

Referring to FIG. 7, a beam profile for multiple emitters according to an embodiment is shown. The top diagram shows a perfectly collimated beam 92 that produces a round spot 94 on the surface of the reflecting object. The beam intensity is uniform throughout the round spot 94, and the intensity of the light transitions sharply at the edge of the round spot 94. In precision LiDAR systems, a beam such as collimated beam 92 has advantages. First, a smaller round spot 94 size will result in fewer locations within the device field of view being illuminated. Since the goal of LiDAR is to measure the distance to a point at a known coincident angle, reducing the number of points that generate a return signal will increase the device's precision. Second, a smaller round spot 94 will generally reduce or remove crosstalk with detectors that are near the on-coincident axis matched detector for this emitter 90. The bottom diagram in FIG. 7 shows a more typical beam profile. The beam 96 diverges as it travels through space. The spot 98 on the surface of the reflected object is elliptical in shape. The light intensity is non-uniform throughout the surface of the spot 98. Depending on emitter construction, the spot will typically have a two-dimensional Gaussian profile or a second-order profile. The point of greatest intensity will not always be the center point of the spot 98.

Figure 8:
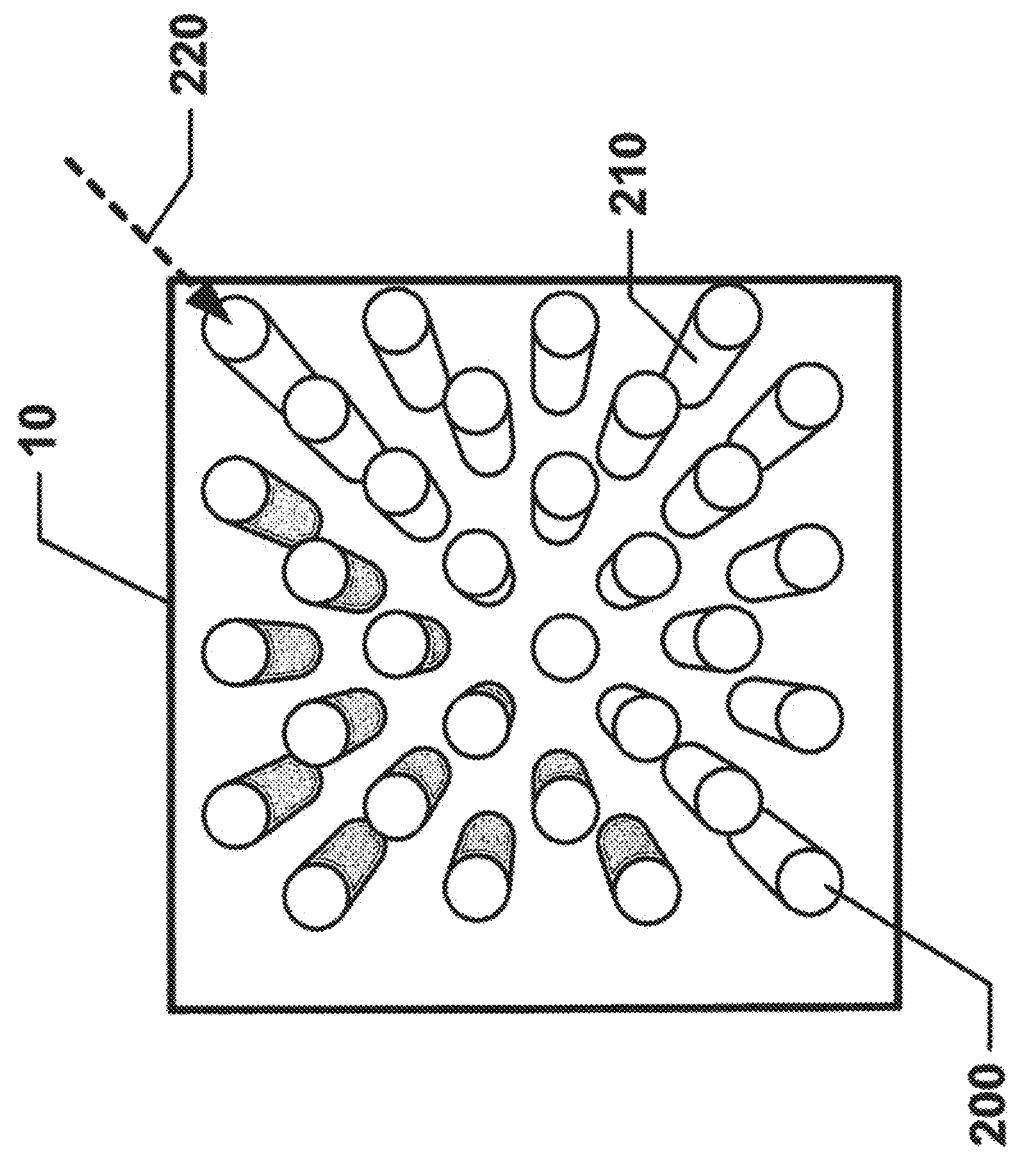
FIG. 8 illustrates the geometry of receptors with directional waveguides according to an embodiment.

Referring to FIG. 8, a top view of detector elements 200 geometry on the emitter/detector array 10 surface is shown according to an embodiment. Light 210 is received at each detector of detector elements 200. Each detector of detector elements 200 has an optimal receive detector vector (coincident axis) 220 along which the maximum optical energy will be transferred. Inbound optical energy that is slightly non-parallel to the detector vector 220 will be partially reduced in intensity due to waveguide blocking or due to the macro lens. Inbound optical energy that is more than slightly-non-parallel to the receive detector vector (coincident axis) 220 will be substantially blocked by the detector waveguide or directed elsewhere by the macro lens. For purposes of the present disclosure, the coincidence axis of a given detector is defined as the center of the area of the light beam 210 as received by the detector not including any modifications to the light beam due to optic elements internal to the LiDAR unit.

Figure 9:
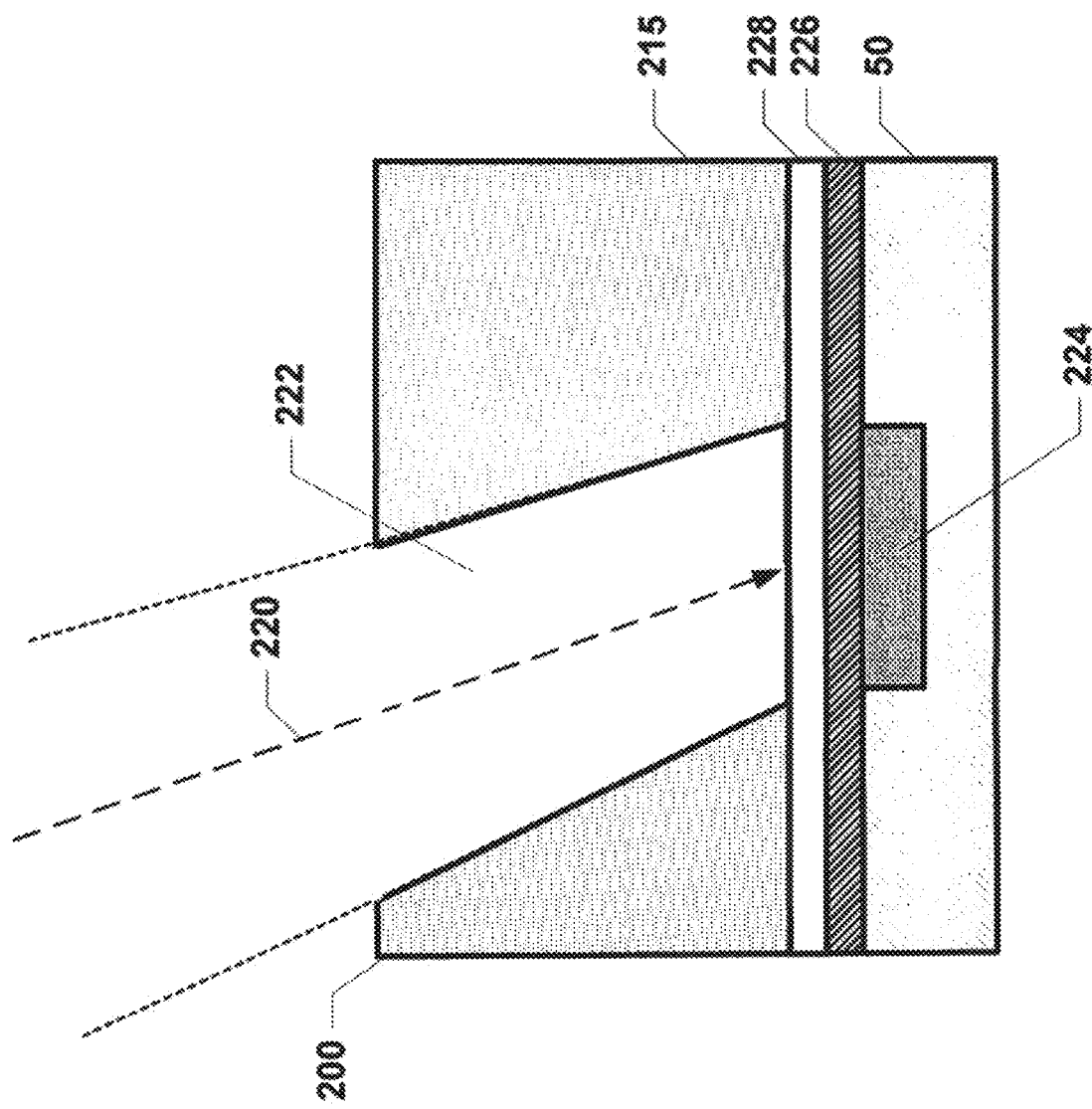
FIG. 9 illustrates the functional layers of a receptor with a directional waveguide according to an embodiment.

Referring to FIG. 9, a cross section of a side view of a detector of detector elements 200 element fabricated with an angular waveguide is shown according to an embodiment. The detector of detector elements 200 is fabricated to receive light transmitted substantially opposite to the direction detector vector 220 of the waveguide axis. The waveguide detector comprises a substrate 50, a photoreceptor 224, a bandpass filter layer 226, a protective layer 228 and the waveguide material 215. A waveguide 222 shall be an air gap or shall consist of a material that is substantially transparent to the wavelength of emitted light. The waveguide wall shall consist of a material that is substantially non-reflective for the wavelength or range of wavelengths of the emitted light. The waveguide 222 geometry is a slightly-diverging trapezoidal cone. The amount of divergence will depend on the minimum range of the device, the lateral distance on the device between the detector vector 220 and the axis of its associated emitter of emitter elements 100, and the depth of the waveguide.

Figure 10:
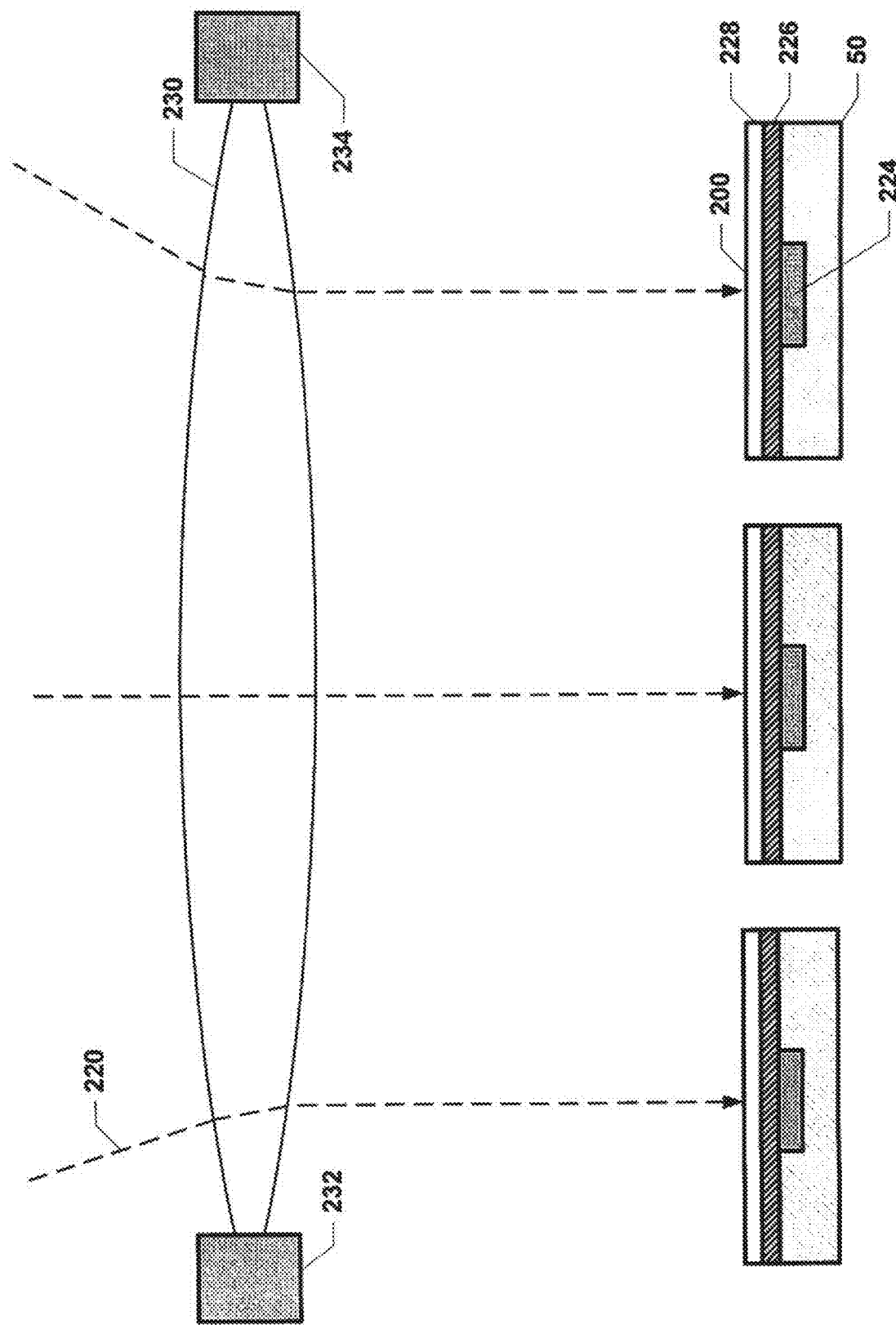
FIG. 10 illustrates the functional layers multiple receptors with a device detector lens according to an embodiment.

Referring to FIG. 10 a cross section side view of a detector element with a macro detector lens 230 is shown according to an embodiment. In embodiments, detector elements 200 comprise a substrate 50, a photoreceptor 224, a bandpass filter layer 226 and a protective layer 228. In other embodiments, light can be received from a diverging field of view at a macro detector lens 230 that directs in-bound light to the surface of detector elements 200.

In embodiments, macro detector lens 230 comprises detector directional lens electrodes 232, 234 positioned on the x-axis and y-axis, whereby the electrodes 232, 234 are configured to control a detector vector 220 along the x-axis and y-axis. The directional lens electrodes can be configured to provide a voltage differential laterally across macro detector lens 230. The directional lens electrode 232, 234 values are addressable and are modified by the control unit 20.

Referring to FIG. 11a, a physical device layout according to an embodiment is shown. In an embodiment, emitter elements 100 and detector elements 200 can be symmetrically arranged in an electro-optical section 242 of the device 240. The number of emitter elements 100 can be equal to the number of detector elements 200, and each detector of detector elements 200 is "paired" with a designated emitter of emitter elements 100. The pulse sequence transmitted by an emitter of emitter elements 100 will be sensed and detected only by its paired detector of detector elements 200. In embodiments, a single global lens can be utilized for both emitter elements 100 and detector elements 200. When single global lens are used for emitter elements 100 and detector elements 200 optics, the distance between the emitter/detector pair must be minimal. In other embodiments, for example, where micro lens are used for emitter elements 100, the distance between each emitter/detector is not as important and can vary according to embodiments. Larger distances between micro-lens emitter elements and waveguide detector elements will require slightly larger diverging waveguides according to FIG. 9. Device circuitry is located in an electronic section 244 of the device 240.

Referring to FIG. 11b a physical device layout according to an embodiment is shown. In embodiments, emitter elements 100 can be arranged in an emitter electro-optical section 248 and detector elements 200 can be arranged in a detector electro-optical section 246 of device 240. The number of detector elements 200 can be equal to or greater than the number of emitter elements 100. In embodiments, for example, each emitter/detector array will comprise K detector elements 200 for each emitter of emitter elements 100, where K is an integer value from 1 to 25.

In other embodiments, each waveguide detector of detector elements 200 is "paired" with a designated emitter of emitter elements 100, whereby the pulse sequence transmitted by an emitter of emitter elements 100 will be sensed and detected only by its paired detector of detector elements 200. For global lens detectors the number of detector elements 200 will be typically 7 to 25 times the number of emitter elements 100, and the paired detector of detector elements 200 that corresponds to each emitter of emitter elements 100 will be determined during device 240 characterization. For embodiments that utilize waveguide detectors, the larger distances between emitter elements 100 and detector elements 200 will require slightly larger diverging waveguides according to eq. 3. Device circuitry is located in the electronic section 244 of the device 240.

Electronic section 242 and electro-optical sections 242, 246, 248 sections for device 240 in FIGS. 11a and 11b can be implemented on the same semiconductor die or on separate die that are placed together and interconnected on a common substrate with common packaging.

FIG. 12 illustrates a timing sequence for multiple emitters. A high level 250 indicates the emitter is energized or turned on by the emitter control circuitry. The energizing level is shown for six emitters that have coincident axes similar to one-another. The bit sequences utilize a rotating primes pulse train and 38-bit sequences, and the emitter levels are shown for a time period 252 ranging from 0 through 37. Since the vectors are similar, emitted energy from one emitter will possibly be received at a detector that is not its pair. To accommodate detection of pulse sequences from a detector's paired emitter the pulse sequences shown in FIG. 12 are sparsely populated. The circuitry for each paired detector is configured to detect the pulse sequence from its paired emitter.

Various methods exist for the selection and detection of pulse sequences that are locally distinct or differentiable and detectable relative to each detector's spatial neighbors. Bit encoding schemes that can be utilized include but are not limited to unordered list of primes, random numbers, pseudo-random numbers, random sequences and pseudo-random sequences. Bit generation schemes can include any encoding scheme which produces non-repeating, distinct values. Potential bit encryption schemes include but are not limited to one time pad, Hash, DES, MDS, and AES. One skilled in the art can select the bit encoding or bit encryption scheme that best fits the computational power of the device and the non-repetitiveness requirements.

FIG. 13 illustrates a detector input signal 260 received by a detector of detector elements 200 in response to an emitter pulse sequence 264. The detector input signal 260 will increase according to reflected light emitted from emitter m, n and reflected off an object. The detector circuitry and the control unit will determine the distance of the object that reflected the signal by measuring the time of flight of the photons in the emitter pulse sequence 264.

The detector input signal 260 will be sampled at a frequency in accordance with eq. 1. In practice the sampling frequency will be considerably greater and will be a multiple of the emitter pulse frequency. In FIG. 13 the sampling frequency for detector m, n is four times the emitter frequency and the sampling times 266 are shown for t0 through t61.

Each detector has a dedicated shift register into which the sampled detector states are stored. A "one" is stored for each sampling time where the detector voltage is greater than a threshold value 262. At each sampling times 266 the bits in the shift register are transferred one location to the left according to the shift direction 284. The control unit clears all shift registers prior to the start of the emitter pulse sequence 264. The initial state of the shift register at t0 268 is shown with all bits being set to zero. At t0—when the emitter pulse sequence is initiated—the pulse compare circuitry will begin looking for a "match" between the emitter pulse sequence 264 and the sampled sequence. The values transmitted in the emitter pulse sequence 264 are stored by the control unit in the detector compare register 286 for use by the compare circuitry.

The compare circuitry performs a comparison at every sampling time. After eleven sampling periods the shift register at t11 270 contains sampled values from the first portion of the received waveform. At t76 the compare circuitry detects a match 274 for emitter bit 0, bit 7 and bit nine, but does not detect a match 276 for bit 4. Therefore, the sampled waveform does not correspond to the emitted waveform. At t90 the compare circuitry detects a match 280 at bit 0, bit 7 and bit 9 as well as a match 282 at bit 4. Since all of the "ones" from a compare register 272 have a corresponding match in the detector shift register 278, the compare circuitry will flag and record the time at which the match occurred.

Figure 14:
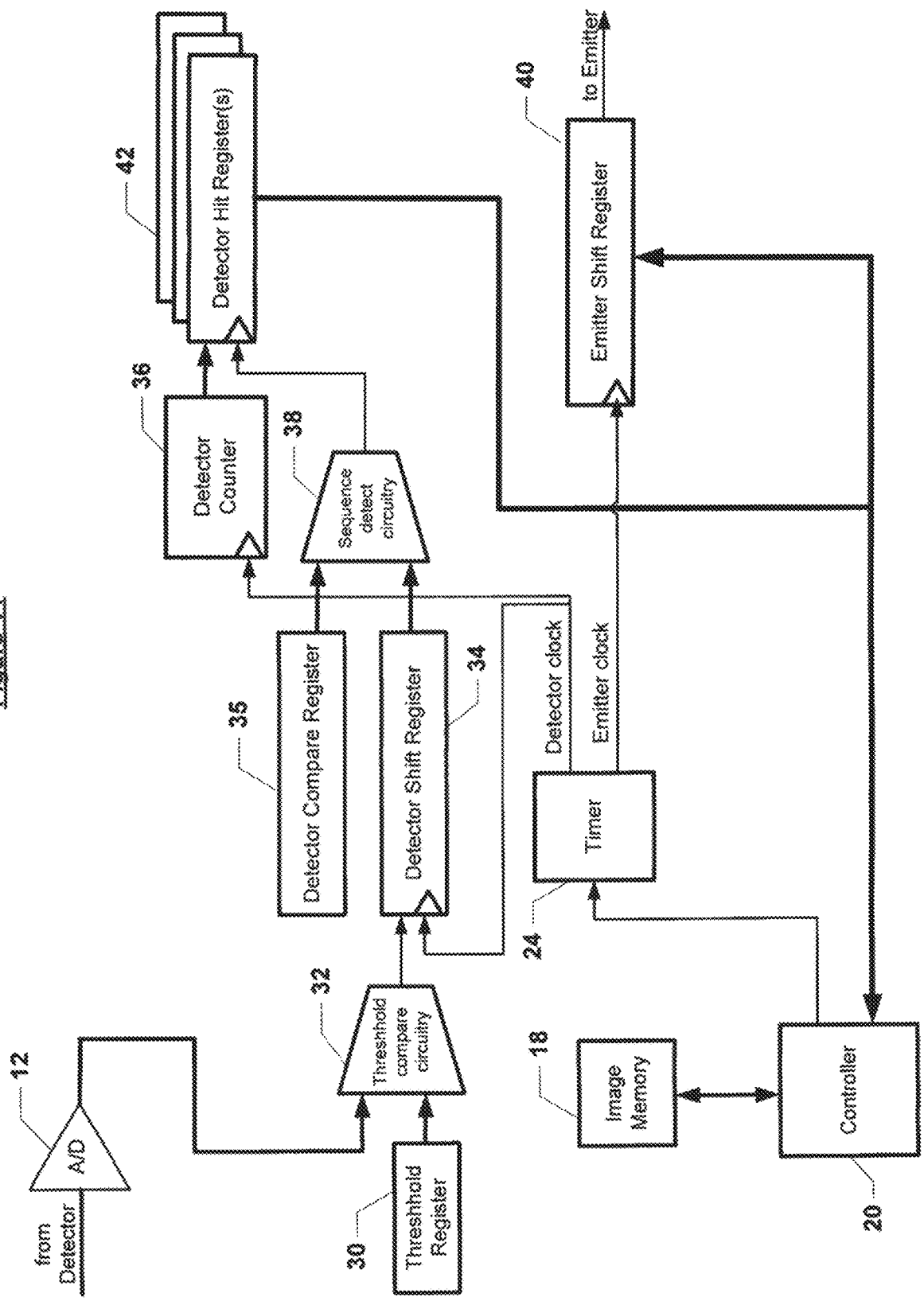
FIG. 14 illustrates the functional block diagram for the emitter and detector circuitry according to an embodiment.

FIG. 14 illustrates functional blocks used for sending a bit sequence to an emitter of emitter elements 100 and processing the sensed signal from an associated detector of detector elements 200. The timer 24 produces synchronized clocks—an emitter clock that controls the timing of the pulses in the pulse generation circuit 22 and a detector clock that governs the processing of information throughout the detection functional blocks. The frequency of the detector clock will typically be an integer multiple of the emitter clock. The integer multiple for the detector clock will depend on the bit sequence encoding scheme.

The output bit of the pulse generation circuit 22 produces the voltage level that will drive an individual emitter of emitter elements 100. Once the emitter sequence has started, the detector circuitry begins collecting information from the detector of detector elements 200. The sampling circuit 12 produces a multi-bit value that is continuously compared to the value in the threshold register 30. For sampled values greater than the value in the threshold register 30, a threshold compare circuitry 32 produces a true value or "1" in a positive logic system. The output of the threshold compare circuitry 32 is the input value for the detector shift register 14. A new value is shifted into the detector shift register 14 on each transition of the detector clock. The detector counter 36 is set to zero at the start of the emitter pulse sequence and will increment its count on each detector clock pulse.

The detector compare register 35 contains the multi-bit value for the emitter pulse sequence. This register is typically a copy of the initial value loaded into the pulse generation circuit 22. A sequence detect circuitry 38 will continuously compare the results of the detector compare register 35 and the detector shift register 14. When the sequence detect circuitry 38 detects a match between its inputs, it signals a detector hit register 42 to record the value of the detector counter 36. This detector hit register 42 value signifies the number of detector clock pulses from the start of the emitter sequence to the sensing of a proper detection sequence.

Advanced LiDAR systems will sometimes measure secondary return signals. For example, light rays will typically reflect off a closer object—otherwise known as the foreground object—and a farther-away object—the background object—as a result of the same emitter pulse or series of pulses. An embodiment of the present disclosure provides multiple detector hit registers 42 to account for multiple return sequences. After the detector counter 36 value for the first return sequence has been stored, subsequent matches detected by the sequence detect circuitry 38 will be recorded in the next detector hit register 42 in the sequence.

The FIG. 14 blocks represent the circuitry for one emitter and its matched detector. For a device with M×N emitters and detectors with all detectors operating simultaneously, M×N circuits like those represented in FIG. 14 are desired. In devices where K detectors operate simultaneously, where K is less than M×N, there will be K detector circuits desired. Each detector circuit will require mapping circuitry that maps a detector output to the appropriate detector circuitry for the current emitter pulse sequence.

In embodiments, the functional blocks in FIG. 14 are implemented in dedicated circuitry. One skilled in the art may replace many of the functional blocks in FIG. 14 with processes implemented with CPUs, microcontrollers, parallel processors, embedded reduced instruction set computing (RISC) machines, programmable logic array, or some other local computing circuitry that takes the place of many dedicated circuit blocks.

Figure 15:
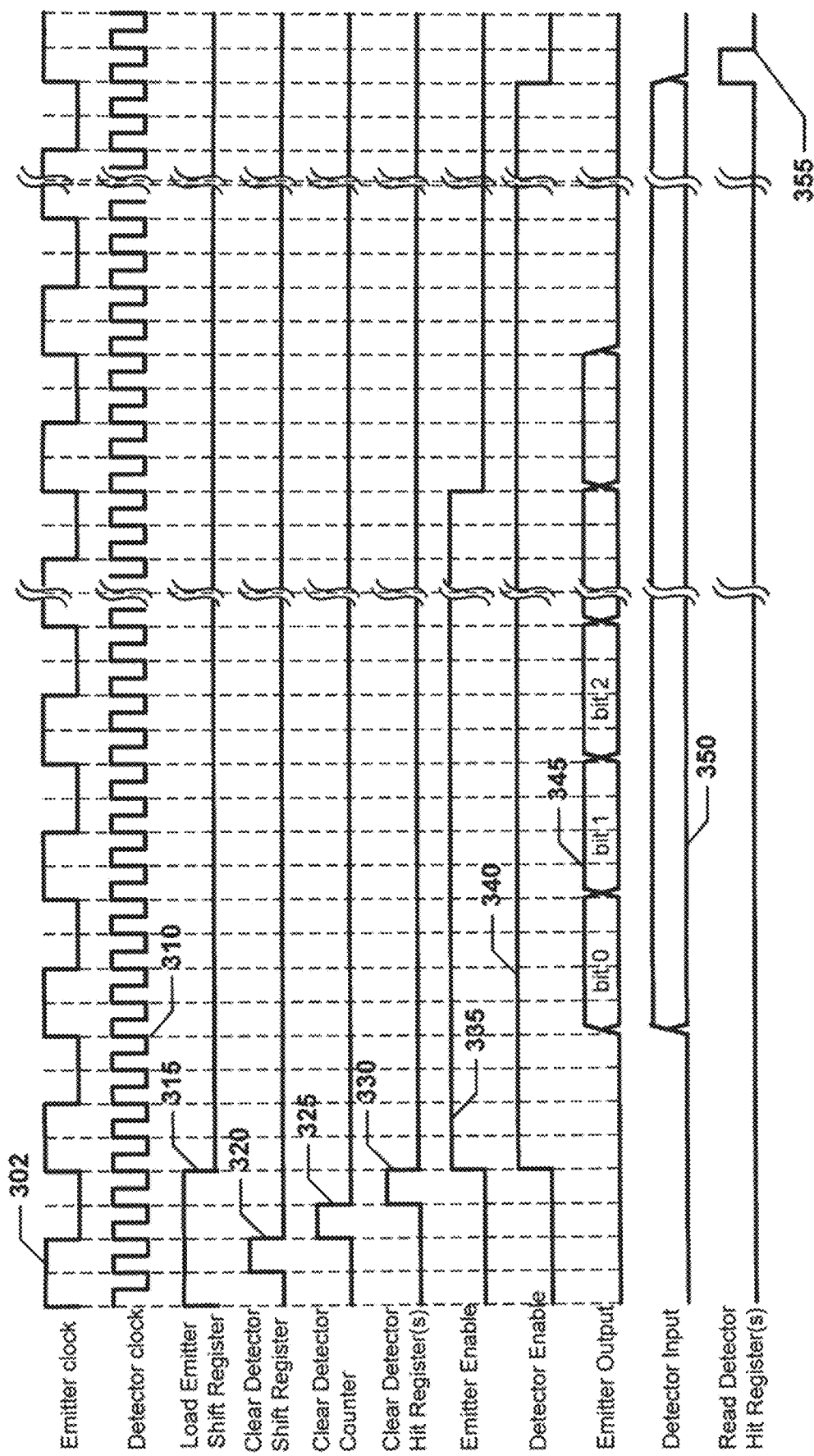
FIG. 15 illustrates the emitter and detector timing for one measurement sequence according to an embodiment.

Referring to FIG. 15 illustrates a timing diagram of elements depicted in the functional blocks of the detector circuitry according to an embodiment. A detector clock 310 frequency is four times the emitter clock 302 frequency. The load pulse generation circuit signal 315 initiates the loading of the shift register of pulse generation circuit 22 with the bit sequence to be transmitted from the emitter. Incoming bits will be stored in the detector shift register, so this register must be cleared prior to the detector being enabled. The clear detector shift register signal 320 sets all of the detector shift register bits to zero.

The detector counter will serve as the timing sequence throughout the detection cycle. The counter must be cleared prior to the start of the detector sequence. The clear detector counter signal 325 sets the all of the detector counter bits to zero. The detector hit registers will store the detector counter values at which the primary and any secondary detected pulses are sensed. A zero value in these registers signifies that a match sequence was not detected, so these registers must be cleared prior to the start of the detector sequence. The clear detector hit register signal 330 sets all of the bits in all of the detector hit registers to zero.

The output from each emitter 345 is enabled by a logic one appearing at the output of the pulse generation circuit 22 only when the emitter enable signal 335 is active. The detector enable signal 340 will activate at the same time as the emitter enable signal 335. The detector enable signal 340 will activate the detector counter, the detector shift register and the sequence detect circuitry.

Upon completion of the shifting of all of the sequence bits out of the pulse generation circuit 22, the emitter enable signal 335 is deactivated, signifying the end of the emitting portion of the emitter/detector sequence. At the end of the detector sequence the detector enable signal 340 will be deactivated, which in turn will discontinue the incrementing of the detector counter, disable the sequence detect circuitry, and disable any further capturing of data in the detector hit registers. The control unit will then activate the read detect hit register signal(s) 355 to process the flight time(s) for the detected pulse sequence(s).

The timing shown in FIG. 15 utilizes synchronous electronics where all components are driven with a common clock source. One skilled in the art could produce control circuitry that operates with multiple asynchronous clocks or in a completely asynchronous fashion. The only element that requires a clock is the counter unit that will mark the time duration between the emitted pulses leaving the emitter and the detected pulses arriving at the detector circuitry.

Upon completion of the emitter detector sequence and the reading of the detector hit registers for element m,n, the control unit will compute the time of flight for sequence m,n:

$$t(\text{flight})_{m,n} = \lambda_{detector} * (k_{m,n} - K_{m,n}) - t_{emitter} - t_{detector} \quad \text{(eq. 3)}$$

where $\lambda_{detector}$ is the period of the detector clock $k_{m,n}$ is the detector counter value for detector m,n when the detector match circuitry is triggered for element m,n K is the number of bits in the detector m,n shift register $t_{emitter}$ is the delay from the energizing of the emitter clock to the energizing of the emitter $t_{detector}$ is the delay from the photons reaching the detector to the energizing of the circuitry at the input of the detector shift registers.

The values of $t_{emitter}$ and $t_{detector}$ can be theoretical values determined from the design of the circuitry or they can be characterized values based on measurements made with the manufactured circuitry from known distances.

Figure 16:
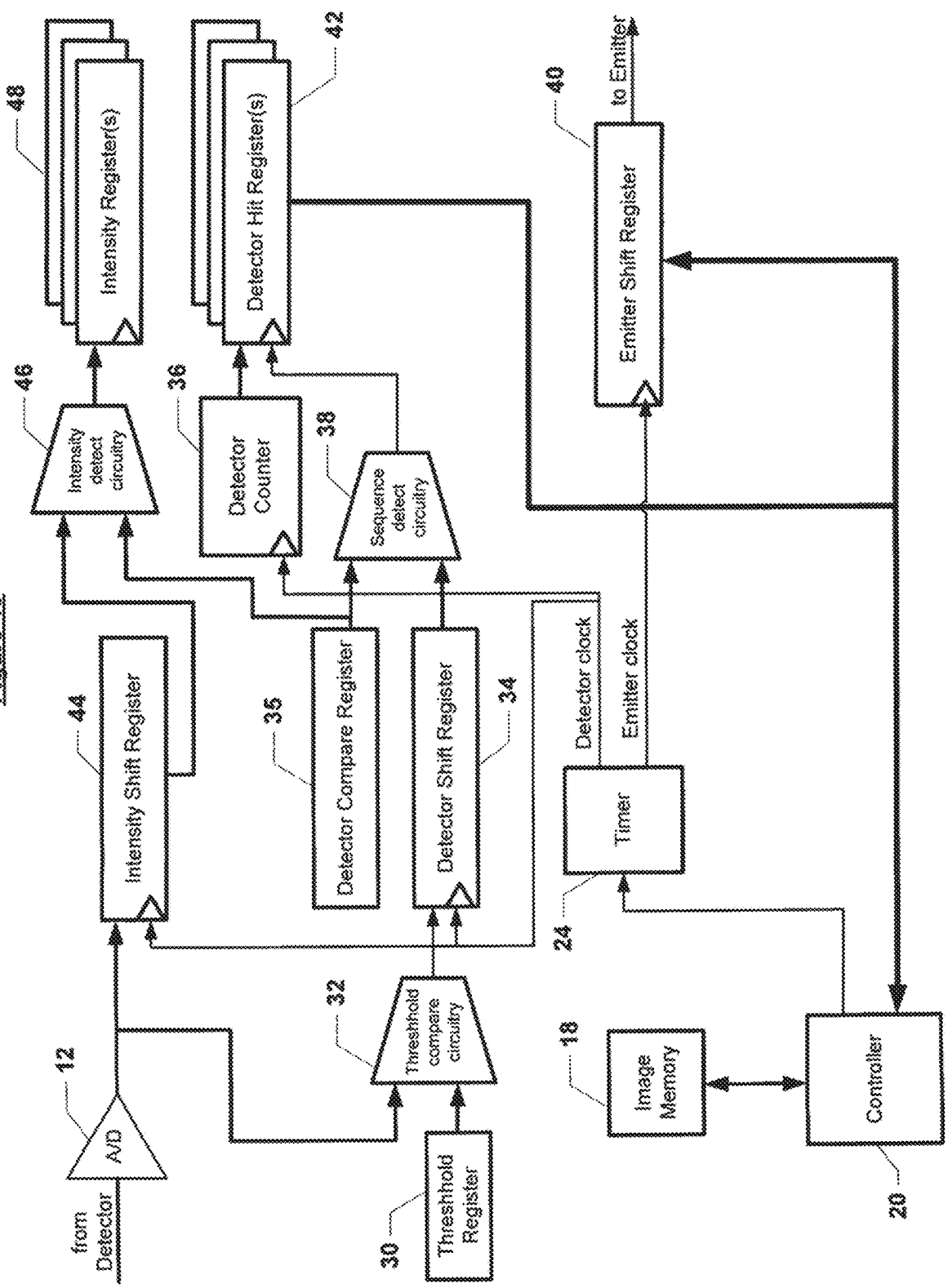
FIG. 16 illustrates the functional block diagram for the emitter and detector circuitry for target intensity measurements according to an embodiment.

The distance to the target that provided the reflected return signal for element m,n is:

$$d_{m,n} = \frac{v_{light} * t(\text{flight})_{m,n}}{2} \quad \text{(eq. 4)}$$

where vlight is the velocity of light in the medium (atmosphere, water, oceans, space, etc.) where the device is used LiDAR systems will utilize time of flight to determine the distance to the object that reflected the light. These systems will typically report a distance at a known angle for every data point. Advanced LiDAR systems will also report an intensity value for each data point, whereby the intensity value conveys information about the object creating the reflected signal. FIG. 16 illustrates a functional diagram of a preferred embodiment of the present disclosure where signal intensity is collected and reported.

Referring to FIG. 16, a functional block used for sending a bit sequence to an emitter of emitter elements 100 and processing the sensed signal from an associated detector of detector elements 200 is depicted according to an embodiment. In embodiments, the timer 24 produces synchronized clocks—an emitter clock that controls the timing of the pulses in the pulse generation circuit 22 and a detector clock that governs the processing of information throughout the detection functional blocks. The frequency of the detector clock will typically be an integer multiple of the emitter clock. The integer multiple for the detector clock will depend on the bit sequence encoding scheme.

The output bit of the pulse generation circuit 22 produces the voltage level that will drive the individual emitter. Once the emitter sequence has started, the detector circuitry begins collecting information from the detector of detector elements 200. The sampling circuit 12 produces a multi-bit value that is captured in the intensity shift register 44. Each subsequent transition of the detector clock will capture a new value from the sampling circuit 12, with all previous values being shifted to the right by one location. For sampled values greater than the value in the threshold register 30, the threshold compare circuitry 32 produces a true value or "1" in a positive logic system. The output of the threshold compare circuitry 32 is the input value for the detector shift register 14. A new value is shifted into the detector shift register 14 on each transition of the detector clock. A detector counter 36 is set to zero at the start of the emitter pulse sequence and will increment its count on each detector clock pulse.

The detector compare register 35 contains the multi-bit value for the emitter pulse sequence. This register is typically a copy of the initial value loaded into the pulse generation circuit 2240. The sequence detect circuitry 38 will continuously compare the results of the detector compare register 35 and the detector shift register 14. When the sequence detect circuitry 38 detects a match between its inputs, it signals the detector hit register 42 to record the value of the detector counter 36. This detector hit register 42 value signifies the number of detector clock pulses from the start of the emitter sequence to the sensing of a proper detection sequence.

The functional blocks in FIG. 16 support two methods for sequence detection. The first method is based on the output of the sequence detect circuitry 38, which compares the binary values generated by the threshold compare circuitry 32 to the detector compare register 35. The second method ignores the hardware threshold value in the threshold register 30 and does not utilize the detector hit register(s) 42. This second method analyzes all of the data in the intensity shift register 44 to determine the time at which the first return pulse train was received. This circuitry can utilize noise cancellation techniques to extract secondary pulse times and intensity values for all detected pulse sequences.

In FIG. 16, a block diagram of circuitry for an emitter element and its matched detector is shown according to an embodiment. In embodiments, an optoelectronic device comprising M×N emitters and detectors with all detectors operating simultaneously, M×N circuits like those represented in FIG. 16 are desired. In optoelectronic devices where K detectors operate simultaneously, where K is less than M×N, there will be K detector circuits desired. Each detector circuit will require mapping circuitry that maps a detector output to the appropriate detector circuitry for the current emitter pulse sequence. In embodiments, the functional blocks in FIG. 16 can be implemented in dedicated circuitry. In other embodiments, the functional blocks in FIG. 16 with processes can be implemented with CPUs, microcontrollers, parallel processors, embedded reduced instruction set computing (RISC) machines, programmable logic arrays, or some other local computing circuitry that takes the place of many dedicated circuit blocks.

FIG. 17 shows detector circuitry wherein each detector utilizes a microprocessor unit (MPU) to determine the times at which reflected signals are received and the associated intensities of the reflected signals. FIG. 17 depicts detector circuitry for an M×N array of detectors, where individual detectors are denoted as m, n where m varies from 0 to M-1 and n varies from 0 to N-1. The number of detectors can be equal to the number of emitters, or can be many times greater than the number of emitters.

The input signal from each detector is digitized by an A/D converter 12 and the digitized signal is presented to the intensity shift register 44. Every intensity shift register 44 captures a new multi-bit intensity value on the leading edge of the detector clock. Values are shifted into the intensity shift registers 44 throughout the entire detection cycle. At the end of the detection cycle each MPU will begin processing the captured and presented information to determine the clock sequences at which valid reflected signals were received. All activated intensity shift registers 44 are clocked for the same number of clock cycles throughout the detection cycle.

The timer 24 will control the clocking of data into all of the intensity shift registers 44. Each element in the detector shift registers is a multi-bit value, and the number of required elements in each intensity shift register will depend on the range of the device, the desired accuracy of the distance measurements, the number of bits in each emitter sequence, and the rate multiplier of the detector clock to the emitter clock. The number of elements for each detector shift register elements is:

$$\text{\# of detector shift register elements} > E*L + (2*R*f_{emitter}*L)/v_{light} \quad \text{(eq. 5)}$$

where E is the number bits in each emitter shift register
L is the clock multiplier signifying L detector clock pulses for each emitter clock pulse
R is the specified range of the device, signifying the maximum distance that can be measured
$f_{emitter}$ is the frequency of the emitter clock
$v_{light}$ is the velocity of light in the medium (atmosphere, water, oceans, space, etc.) where the device is used The circuitry blocks for MPU m,n 450 are shown in FIG. 17. The intensity shift registers 44 are addressable and readable over the intensity shift register bus 452 by the controller 20 and by each MPU. Upon the completion of the detection cycle, MPU m, n 450 reads the value from intensity shift register m, n 454 and the value from the detector compare register m, n 456. For algorithms that utilize only single detector information, these two lone data elements are used by the MPU to process the received waveform and determine how many return signals were detected and the associated intensity for each return signal. The number of elapsed clock pulses for each detected signal is stored by MPU m, n 450 in the detector hit registers m, n 458, and their associated intensities are stored in the intensity registers m, n 460.

Many algorithms for signal analysis and detection utilize information from neighboring detectors and/or emitters. The detector bus 452 allows each MPU to access captured return signals from neighboring detectors. In addition, each MPU can access the detector compare register 456 for every detector via the detector bus to determine if an on-coincident axis emitter was activated for that detector during the previous emitter sequence. A null value in a neighboring detector compare register 456 will signify to other MPUs that an on-coincident axis emitter was not active during the previous emitter cycle.

FIG. 17 shows two other MPUs in the detector circuitry— MPU 0,0 462 and MPU M-1, N-1 464. For a device that has M×N detectors, there will be M×N MPUs, with each MPU having its own dedicated detector hit registers and intensity registers, and having access to all intensity shift registers and all detector compare registers via the detector bus.

The device MPUs are dedicated microcontroller units that have reduced instruction sets specifically tailored to signal processing. Each MPU contains a dedicated ALU (arithmetic logic unit), control store, processing registers, instruction memory, and configuration memory. Upon power up of the device, each MPU is configured to establish its associated on-coincident axis emitter. According to an embodiment, not every MPU will be associated with an on-coincident axis emitter.

High-speed applications require one MPU for each detector. One skilled in the art will understand that conventional multiplexing techniques can be applied to devise a system wherein one MPU could service multiple detectors. The functionality of all of the MPUs could be replaced by a controller 20 with sufficient resources.

Referring to FIG. 18*a*, a grid 365 showing an ideal location 370 for emitted beams is depicted according to an embodiment. Such a grid could be used for device characterization, whereby the transmission vector of each emitter is determined and stored in the vector memory. Prior to characterization, micro lenses can be modified for more precise aiming. A misaligned emitter beam 360 misses the ideal location 370 on the grid 365 in both the horizontal and vertical dimensions. FIG. 18*b* depicts an expanded view of a beam aligned on grid 365 and a misaligned emitter beam 360. The horizontal offset 375 is reduced by making changes to the voltages to the horizontal lens control for the lens that corresponds to this emitter. The vertical offset 380 is reduced by making changes to the vertical lens control for the lens that corresponds to this emitter. The voltages used to align each micro lens are stored in the vector memory. These voltage values are saved during power down of the device. During the power up sequence, the control unit will load the values for the micro lenses into the lens control circuitry for each micro lens.

The grid 365 shown in FIG. 18*a* can also be used for device characterization. For each emitter, the as-built emitter vector (coincident axis) must be determined. In embodiments, characterization includes measuring the point at which each emitter beam contacts the grid 365 and determining the vector of the beam, where the beam vector is described relative to a known vector on the device. A typical way of expressing the emitter vector is to utilize uvw vector nomenclature where the vector is relative to the normal vector of the device. The characterized vector for each emitter is stored in the vector memory and saved when the device is powered off.

Referring to FIG. 19 a dense detector array 290 according to an embodiment is depicted. In embodiments, dense detector array 290 comprises a plurality of detector elements for each emitter element. The dense detector array 290 can be utilized with waveguide detectors or with macro lens detectors. When used with macro lens detectors, the detector characterization is performed after the macro lens is permanently attached to the device, thus accounting for any alignment tolerances between the dense detector array 290 and the lens. Characterization of dense detector array 290 can be used to determine which detector element has the greatest signal strength for each emitter element. In FIG. 19, primary detector 292 has been established as the best on-coincident axis match for an emitter. Characterization information for detectors can be saved in vector memory.

In embodiments, detector elements in a first concentric ring surrounding a primary detector 292 are designated as secondary detectors 294. In some embodiments, secondary detectors 294 are adjacent neighboring detectors that form the first concentric ring. Each primary detector 292 in FIG. 19 can comprise three or more secondary detectors 294. The secondary detectors can be utilized to sample data to enhance the signal strength of the primary waveform. In embodiments, sampled waveforms from the secondary detectors can be utilized in a post-processed mode to perform noise suppression and/or noise cancellation on the primary waveform. Detectors in the second concentric ring surrounding the primary detector 292 can be designated as a tertiary detector 296.

In embodiments, each primary detector 292 in FIG. 19 can comprise three or more tertiary detectors 296. The tertiary detectors can be utilized to sample data to enhance the signal strength of the primary waveform. In other embodiments, sampled waveforms from the tertiary detectors can be utilized in a post-processed mode to perform noise suppression and/or noise cancellation on the primary waveform. In addition to noise suppression and noise cancellation, the primary, secondary and in some cases tertiary detector information can be utilized to perform one or more of the following techniques including but not limited to time domain methods like FFT, DFT and largest common point, statistical methods like least squares, gradient following, projection kernels and Bayesian, and pattern matching techniques like Boyer-Moore, Kuth-Morris-Pratt, finite state neural networks and Graham's. In operation, for example, the optical center of the inbound signal may not coincide precisely with the center of a detector. For each emitter, floating point values can be used to designate a primary detector. By expressing the row and column of the primary detector as floating point numbers, the neighboring detectors can be weighted accordingly when multiple detectors are used to receive incoming sampled waveforms.

Figure 20:
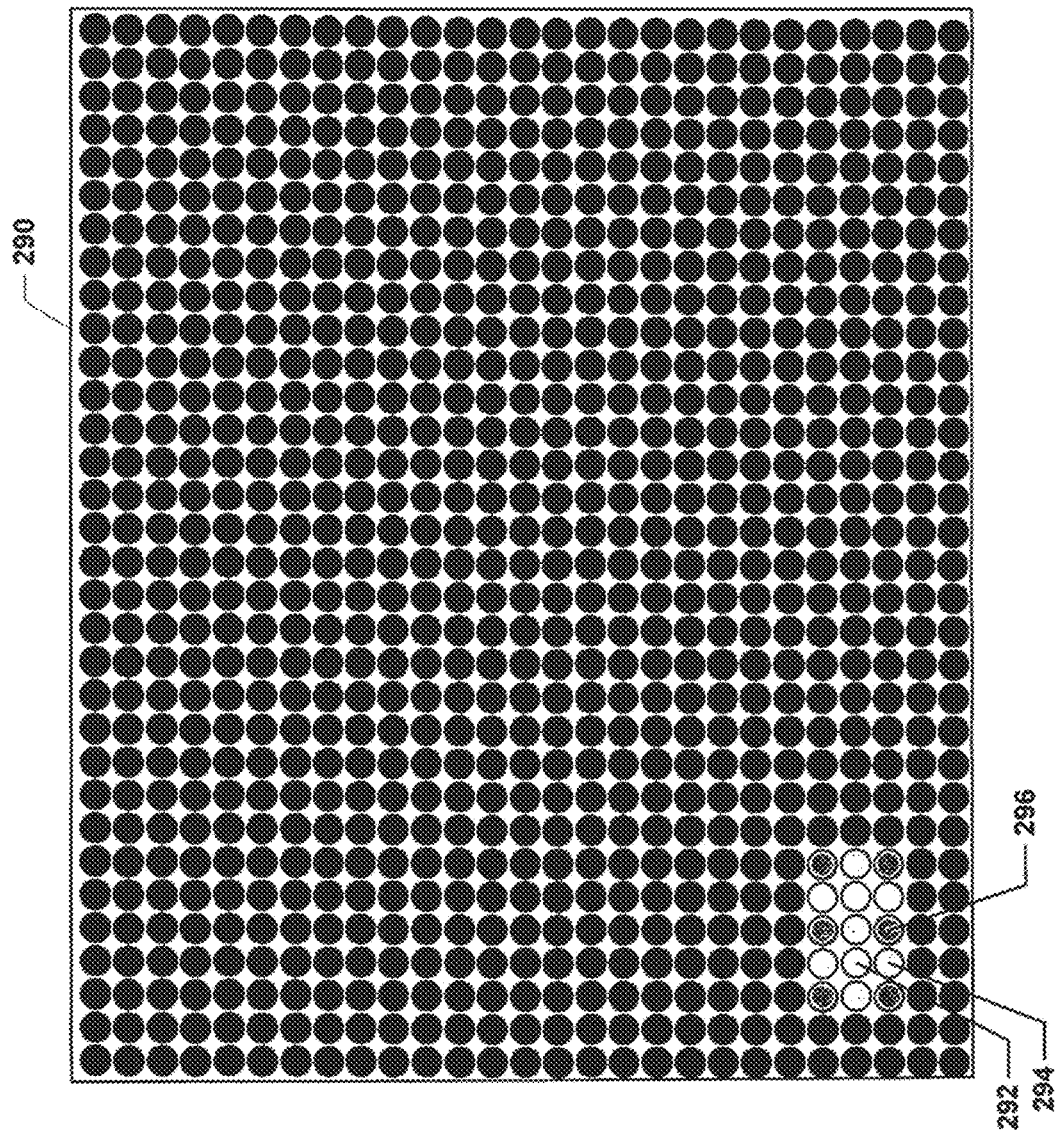
FIG. 20 illustrates an orthogonal dense detector array according to an embodiment.

FIG. 20 portrays an orthogonal detector layout for a dense array in a preferred embodiment. A detector designated as a primary detector 292 is shown near four secondary detectors 294 and four tertiary detectors 296.

Figure 21:
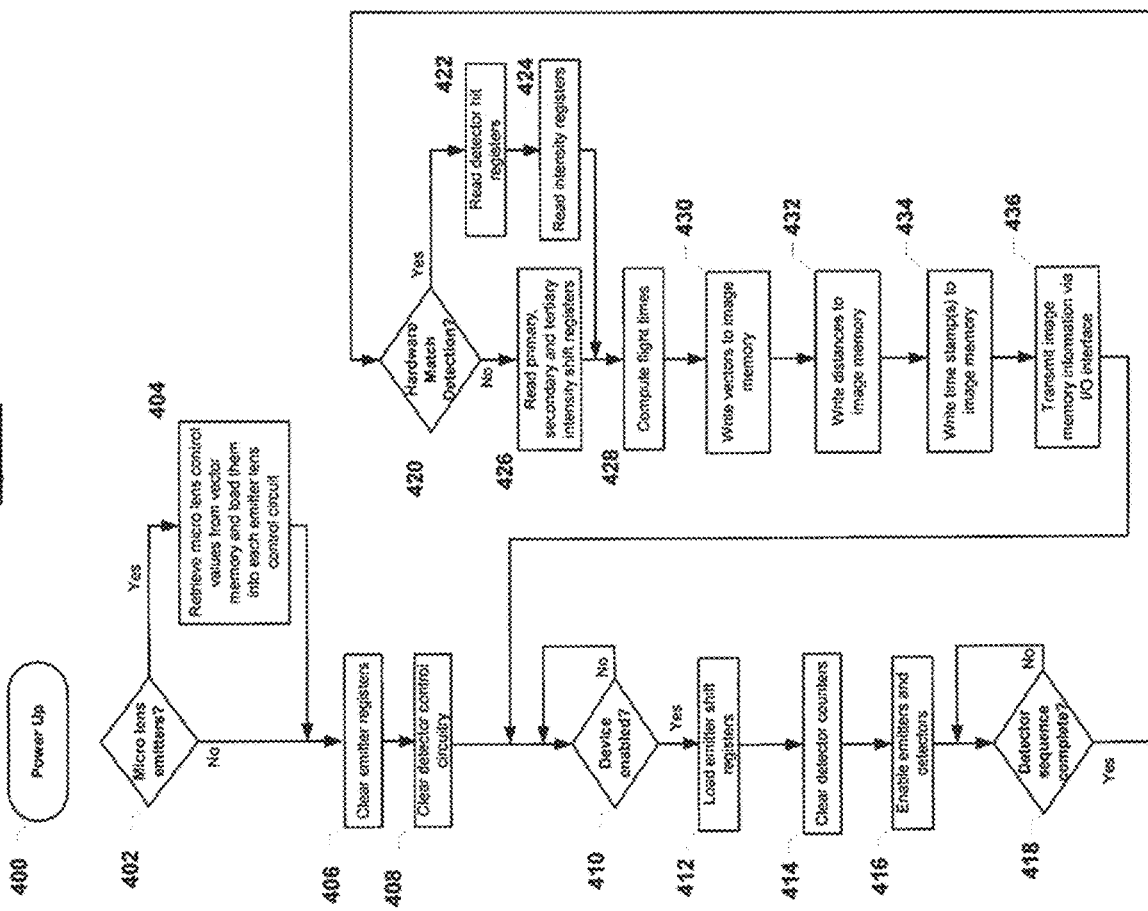
FIG. 21 illustrates the operational flowchart of the device according to an embodiment.

Referring to FIG. 21, a functional flowchart for the operation of the optoelectronic device according to an embodiment is shown. Upon power up at 400, the control unit 20 will determine the type of device 240. When the device 240 has micro lens emitters, the control unit 20 at 404 will read the lens voltages from vector memory and store the appropriate values in the lens control circuitry foe each micro lens. Circuitry used for transmission and receipt of light are cleared, including sampling circuit 12 at 406 and detector shift registers 14 at 408. These operations are performed on emitter elements 100 and detector elements 200 on the device 240.

When the device 240 is enabled at 410, the control unit 20 determines the pulse patterns for each emitter of emitter elements 100 and will load shift registers of the pulse generation circuit 22 at 412, clear detector counters at 414 and enable emitter elements 100 and detector elements 200 at 416 that will be utilized in the ensuing emitter/detector sequence. At the completion of the detector sequence at 418, the resultant values are retrieved for each detector of detector elements 200 that was activated for the sequence. At 420, for devices that utilize hardware matches, the detector hit register 4 and intensity registers are read for each enabled detector. For devices that utilize software matches the intensity shift registers are read for each primary, secondary and tertiary shift register at 426.

Having collected the appropriate information for all enabled detectors, the control unit will compute flight times at 428, write the vectors at 430 to image memory, write a distance at 432 to image memory, and write the time stamp at 434 to image memory that marks the beginning of the emitter transmission for each emitter of emitter elements 100. Upon completion of the computations and storage for all detectors, the contents of image memory are transmitted via the I/O interface at 436 to the upstream control unit 20.

Figure 22:
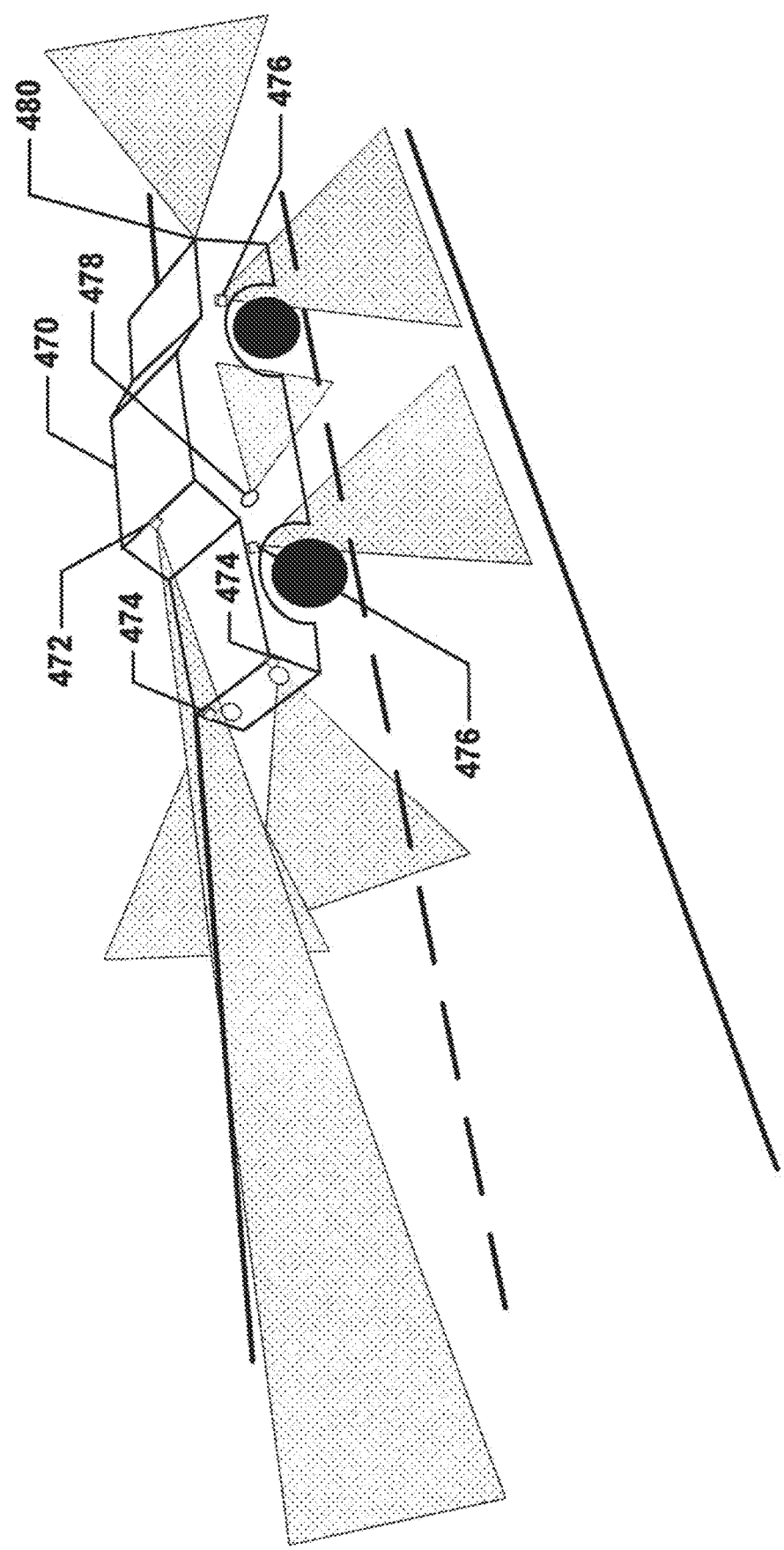
FIG. 22 illustrates the use of the device in a vehicle navigation application.

FIG. 22 depicts the use of a group of LiDAR units in accordance with one embodiment of the present disclosure. A passenger vehicle 470 has a long-range device 472 used for real-time mapping and forward obstacle identification. Two shorter-range, wider-field-of-view front-facing devices 474 are used for mapping of adjacent lanes, road edges, and connector roadways in addition to the identification of obstacles not aligned with the direction of travel. Each side of the vehicle 470 has two wide-angle devices 476 used for object identification and velocity determination of neighboring vehicles. Two outboard rear-facing devices 478 are used for blind spot detection in human-operated vehicles or for object identification in autonomous vehicles. A rear-facing device 480 is used for object identification and velocity determination of vehicles. All of the approaching devices 472, 474, 476, 478, 480 can be identical devices with a single field of view, or they can be application specific, each with a separate field of view, emitter/detector wavelength, detection and measurement distance operating range, and number of emitters.

Figure 23:
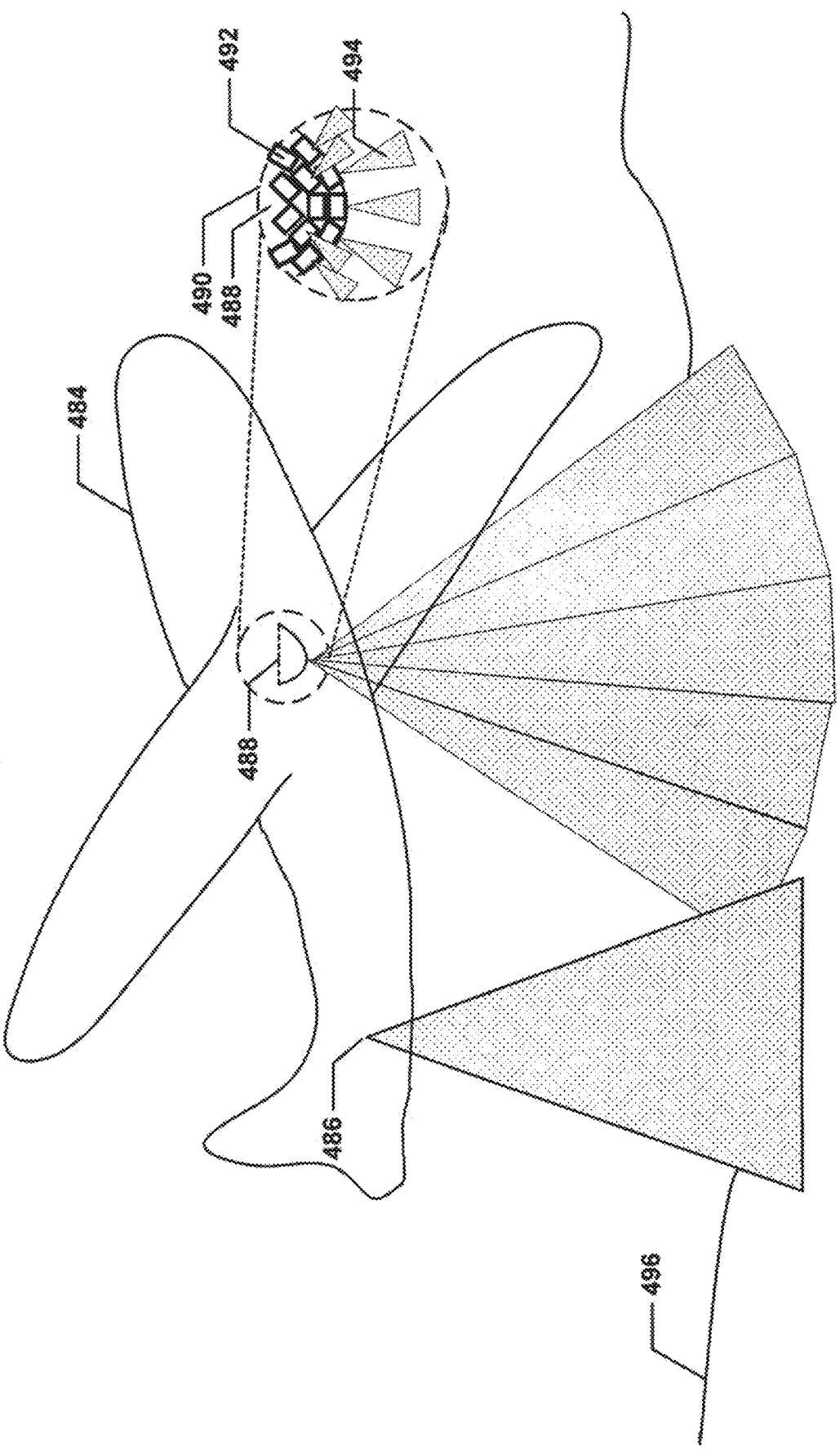
FIG. 23 illustrates the use of the devices in an airborne data acquisition application.

FIG. 23 depicts the use of a group of LiDAR units in accordance with another embodiment of the present disclosure. A data acquisition aircraft 484 utilizes a single wide-field-of-view device 486 for terrain 496 mapping, pixel depth acquisition, or remote sensing. Alternately, the aircraft 484 implements a higher-resolution, wider-field-of-view apparatus 488 that utilizes multiple devices 492. The exploded view 490 of the apparatus 488 depicts devices 492 oriented in a geodesic pattern so the combined fields-of-view 494 for all devices 492 yields a higher-resolution acquisition path than could be realized with a single device 492.

In various embodiments of the present disclosure the emitters are constructed using 650 nanometer lasers. One skilled in the art can utilize other wavelengths for emitter and detector construction as long as the emitted radiation maintains its directionality while transmitting though the medium and as long as the selected wavelength is not highly absorptive by the objects contained in the medium. In some embodiments, the light energy is emitted and received as collimated or coherent electromagnetic energy, such as common laser wavelengths of 650 nm, 905 nm or 1550 nm. In some embodiments, the light energy can be in the wavelength ranges of ultraviolet (UV)—100-400 nm, visible—400-700 nm, near infrared (NIR)—700-1400 nm, infrared (IR)—1400-8000 nm, long-wavelength IR (LWIR)—8 um-15 um, or far IR (FIR)—15 um-1000 um. The various embodiments of the present disclosure can provide reduction of interference at these various wavelengths not only among emitted and reflected light energy of LiDAR devices, but also emitted and reflected light energy from other ambient sources such as vehicle headlights and the sun that will also be sources of interference for typical LiDAR units.

Various embodiments of devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present disclosure, it is expressly intended that the provisions of Section 112, sixth paragraph of 35 U.S.C. are not to be invoked unless the specific terms "means for" or "step for" are recited in a claim.

What is claimed is:

1. A light detection and ranging (LiDAR) device comprising:
an emitter array comprising a plurality of emitters, the plurality of emitters arranged on a 2-dimensional emitter plane and configured to respectively emit a plurality of light beams;
an emission macro lens configured to:
receive the plurality of light beams emitted from the plurality of emitters, and
steer the received plurality of light beams in their own unique emitting directions relative to a direction normal to the 2-dimensional emitter plane;
a dense detector array comprising a plurality of detectors arranged on a 2-dimensional detector plane,
a number of the plurality of detectors being greater than a number of the plurality of emitters, and
each of the plurality of detectors configured to detect light;
a detection macro lens configured to:
receive a plurality of inbound lights incident in their own unique incident directions relative to a normal direction of the 2-dimensional detector plane, and
direct the received plurality of inbound lights to corresponding groups of the plurality of detectors,
the detection macro lens and the emission macro lens configured to cause the unique emitting directions of the plurality of light beams to be respectively matched to the unique incident directions of the plurality of inbound lights such that each emitter is paired with a corresponding group of detectors comprising two or more detectors among the plurality of detectors; and
a controller configured to compute a distance based on one or more of detection signals generated by each of the corresponding groups of the plurality of detectors,
each corresponding group of the plurality of detectors comprising K detectors, K being positive integer equal to or greater than 2.

2. The LiDAR device of claim 1, wherein the K detectors comprise a primary detector element and (K−1) secondary detector elements.

3. The LiDAR device of claim 2, wherein the primary detector is configured to have the greatest signal strength among detectors included in the corresponding group of detectors.

4. The LiDAR device of claim 2, wherein the controller is configured to:
receive, from the primary detector element, a primary signal generated based on one or more inbound lights directed to the primary detector element,
receive, from the (K−1) secondary detector elements, (K−1) secondary signals generated based on one or more inbound lights directed to each of the (K−1) secondary detector elements, and
compute the distance based on both the primary signal and the (K−1) secondary signals.

5. The LiDAR device of claim 1, further comprising:
a bandpass filter located between the dense detector array and the detection macro lens.

6. The LiDAR device of claim 5, further comprising:
a waveguide layer located between the bandpass filter and the detection macro lens,
wherein the waveguide layer comprises an aperture configured to enable only an inbound light, parallel to a corresponding incident unique direction of corresponding groups of the plurality of detectors, to pass therethrough.

7. The LiDAR device of claim 1, further comprising:
a micro lens array disposed between the emitter array and the emission macro lens,
wherein the micro lens array is configured to converge the light beams emitted from the plurality of emitters.

8. The LiDAR device of claim 7, wherein the micro lens array comprises a plurality of micro lenses respectively disposed on the plurality of emitters.

9. The LiDAR device of claim 8, wherein the emission macro lens is configured to:
receive the converged light beams from the micro lenses of the plurality of emitters; and
steer the received converged light beams in the unique emitting directions.

10. The LiDAR device of claim 1, wherein the controller is configured to independently control the plurality of emitters.

11. The LiDAR device of claim 1, wherein the emission macro lens is configured to receive converged light beams from the plurality of emitters and output a plurality of diverged light beams, and
wherein the detection macro lens is configured to receive a plurality of inbound lights from a diverging field of view and direct the plurality of inbound lights to the corresponding groups of detectors.

12. The LiDAR device of claim 1, wherein the emitter array and the dense detector array are configured to be implemented on the same semiconductor die.

13. The LiDAR device of claim 1, wherein the emitter array is configured to be implemented on a first semiconductor die, and
wherein the dense detector array is configured to be implemented on a second semiconductor die separated from the first semiconductor die.

14. The LiDAR device of claim 13, wherein the first semiconductor die and the second semiconductor die are interconnected on a common substrate.

15. The LiDAR device of claim 1, wherein a detection signal generated by at least one detector of each group of detectors is configured to be used for noise suppression of a detection signal generated by another detector of each group of detectors.

16. The LiDAR device of claim 1, wherein a detection signal generated by at least one detector of each group of the detectors is configured to be used to enhance a detection signal generated by another detector of each group of the detectors.

17. The LiDAR device of claim 1, wherein K is one of 7 to 25.

* * * * *